US011958358B2

(12) United States Patent
Oba et al.

(10) Patent No.: US 11,958,358 B2
(45) Date of Patent: Apr. 16, 2024

(54) IMAGE PROCESSING APPARATUS, MOVING APPARATUS, METHOD, AND PROGRAM

(71) Applicant: Sony Semiconductor Solutions Corporation, Kanagawa (JP)

(72) Inventors: Eiji Oba, Tokyo (JP); Mitsuharu Ohki, Tokyo (JP); Shigeyuki Baba, Tokyo (JP); Yoshikuni Nomura, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 772 days.

(21) Appl. No.: 17/052,144

(22) PCT Filed: Apr. 9, 2019

(86) PCT No.: PCT/JP2019/015379
§ 371 (c)(1),
(2) Date: Oct. 30, 2020

(87) PCT Pub. No.: WO2019/216087
PCT Pub. Date: Nov. 14, 2019

(65) Prior Publication Data
US 2021/0370773 A1  Dec. 2, 2021

(30) Foreign Application Priority Data

May 8, 2018 (JP) .................................. 2018-089667

(51) Int. Cl.
*B60K 35/00* (2006.01)
*B60R 1/00* (2022.01)
*G06V 20/59* (2022.01)

(52) U.S. Cl.
CPC ................ *B60K 35/00* (2013.01); *B60R 1/00* (2013.01); *G06V 20/597* (2022.01);
(Continued)

(58) Field of Classification Search
CPC .............. B60K 35/00; B60K 2370/152; B60K 2370/736; G06V 20/597; B60R 1/00;
(Continued)

(56) References Cited

U.S. PATENT DOCUMENTS

2010/0134519 A1*  6/2010  Yamada .................. G06T 11/00
                                                                  382/104
2016/0137126 A1*  5/2016  Fürsich ..................... B60R 1/00
                                                                  348/148
(Continued)

FOREIGN PATENT DOCUMENTS

EP      2743133 A2     6/2014
EP      3222972 A1 *   9/2017  ................ B60J 1/02
(Continued)

OTHER PUBLICATIONS

International Search Report and English translation thereof dated Jul. 2, 2019 in connection with International Application No. PCT/JP2019/015379.
(Continued)

*Primary Examiner* — Atul Trivedi
(74) *Attorney, Agent, or Firm* — Wolf, Greenfield & Sacks, P.C.

(57) ABSTRACT

Configuration, in which images output to a display unit are switched and displayed in accordance with the behavior of a driver, such as movements of the head of the driver, is achieved. Driver information indicating the behavior of the driver of a moving apparatus and images captured by a plurality of cameras that images a situation around the moving apparatus from different viewpoints are input. The images output to the display unit are switched in accordance with the driver information. The plurality of cameras is, for example, a plurality of rear cameras installed in the rear of the moving apparatus. For example, a direction of the face or line-of-sight of the driver is detected. An image in a
(Continued)

direction corresponding to the detected direction of the face or line-of-sight of the driver is selected as an output image, and displayed on the display unit. Alternatively, an image in a direction indicated by a gesture of the driver is selected, and displayed on the display unit.

15 Claims, 25 Drawing Sheets

(52) U.S. Cl.
CPC .. *B60K 2370/146* (2019.05); *B60K 2370/152* (2019.05); *B60K 2370/736* (2019.05); *B60R 2300/105* (2013.01); *B60R 2300/202* (2013.01); *B60R 2300/8006* (2013.01)

(58) Field of Classification Search
CPC ........ B60R 2300/105; B60R 2300/202; B60R 2300/8006
USPC .............................................................. 701/36
See application file for complete search history.

(56) References Cited

U.S. PATENT DOCUMENTS

| | | | |
|---|---|---|---|
| 2017/0054949 A1* | 2/2017 | Shaw | G02B 27/0101 |
| 2017/0217372 A1* | 8/2017 | Lu | H04N 7/181 |
| 2017/0343799 A1* | 11/2017 | Ito | G02B 27/0093 |
| 2018/0015879 A1* | 1/2018 | Kim | G08G 1/167 |
| 2018/0032824 A1* | 2/2018 | Yamamoto | G01S 15/931 |
| 2018/0056996 A1* | 3/2018 | Lee | B60W 10/18 |
| 2018/0093613 A1* | 4/2018 | Timoneda | B60R 1/12 |
| 2018/0093619 A1* | 4/2018 | Han | B60R 1/00 |
| 2018/0099661 A1* | 4/2018 | Bae | B62D 15/0285 |
| 2018/0101736 A1* | 4/2018 | Han | G06T 11/60 |
| 2018/0126903 A1* | 5/2018 | Herrmann | G06V 20/58 |
| 2018/0178729 A1* | 6/2018 | Festerling, Jr. | B60R 1/12 |
| 2021/0078598 A1* | 3/2021 | Kim | G06V 40/10 |
| 2021/0088784 A1* | 3/2021 | Whitmire | G02B 27/0101 |
| 2021/0152784 A1* | 5/2021 | Lu | H04N 7/181 |
| 2021/0182625 A1* | 6/2021 | Arar | G06V 40/193 |
| 2021/0197725 A1* | 7/2021 | Imamura | B60R 1/26 |
| 2021/0291734 A1* | 9/2021 | Zafeirakis | B60R 1/26 |
| 2021/0303881 A1* | 9/2021 | Hara | B60W 30/06 |
| 2021/0354722 A1* | 11/2021 | Kim | G01C 21/3492 |
| 2022/0230456 A1* | 7/2022 | Kasarla | G06F 21/32 |

FOREIGN PATENT DOCUMENTS

| | | | | |
|---|---|---|---|---|
| EP | 3967552 A1 | * | 3/2022 | ............ B60R 1/26 |
| JP | 2009-253571 A | | 10/2009 | |
| JP | 2012-124610 A | | 6/2012 | |
| JP | 2013-216286 A | | 10/2013 | |
| JP | 2017211828 A | | 11/2017 | |
| KR | 20210100608 A | * | 8/2021 | ........... H04N 13/383 |
| KR | 20210100610 A | * | 8/2021 | ........... H04N 13/383 |
| KR | 20210100611 A | * | 8/2021 | ........... H04N 13/383 |
| WO | WO-2013144998 A1 | * | 10/2013 | ............. B60R 1/00 |
| WO | WO-2016170785 A1 | | 4/2017 | |
| WO | WO-2017130439 A1 | | 8/2017 | |
| WO | WO 2018/012299 A1 | | 1/2018 | |
| WO | WO 2018/037789 A1 | | 3/2018 | |
| WO | WO-2018047400 A1 | | 3/2018 | |

OTHER PUBLICATIONS

International Written Opinion and English translation thereof dated Jul. 2, 2019 in connection with International Application No. PCT/JP2019/015379.
International Preliminary Report on Patentability and English translation thereof dated Nov. 19, 2020 in connection with International Application No. PCT/JP2019/015379.
Extended European Search Report dated Mar. 17, 2021 in connection with European Application No. 19799505.3.

* cited by examiner

FIG. 11
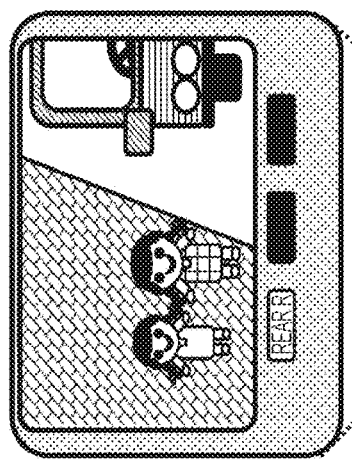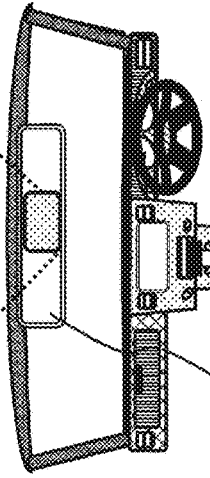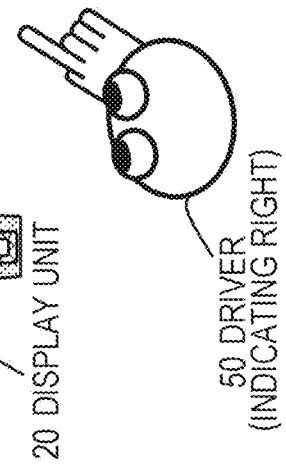
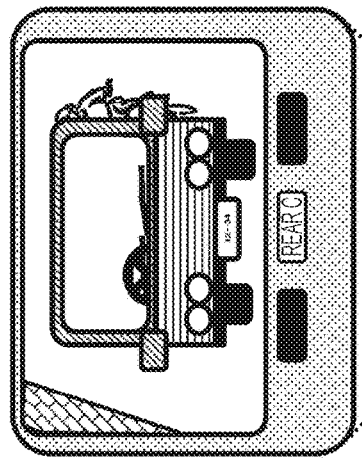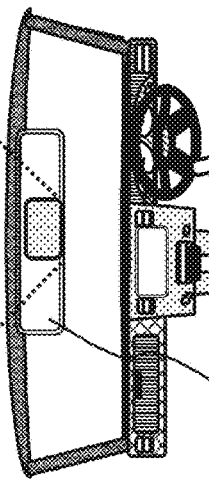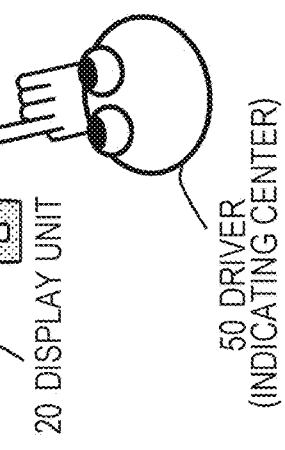
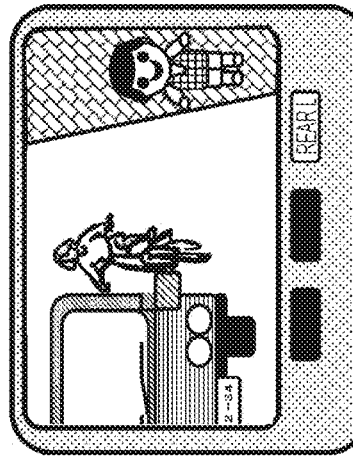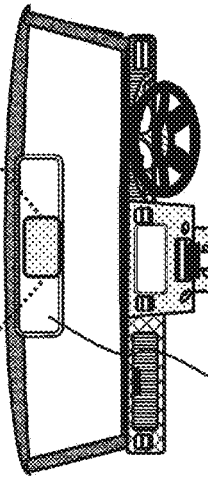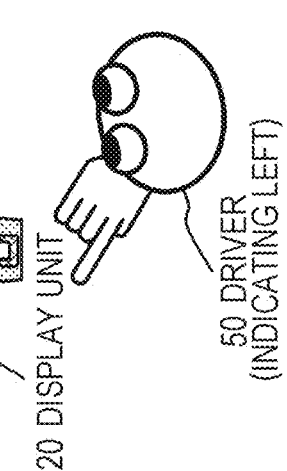

FIG. 22
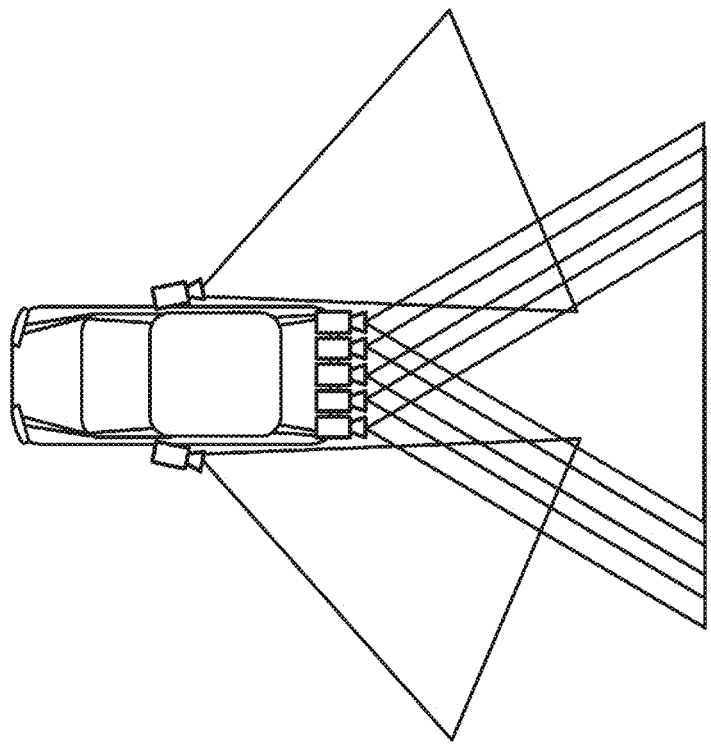
(b) EXAMPLE OF REAR CAMERA LINEAR ARRANGEMENT
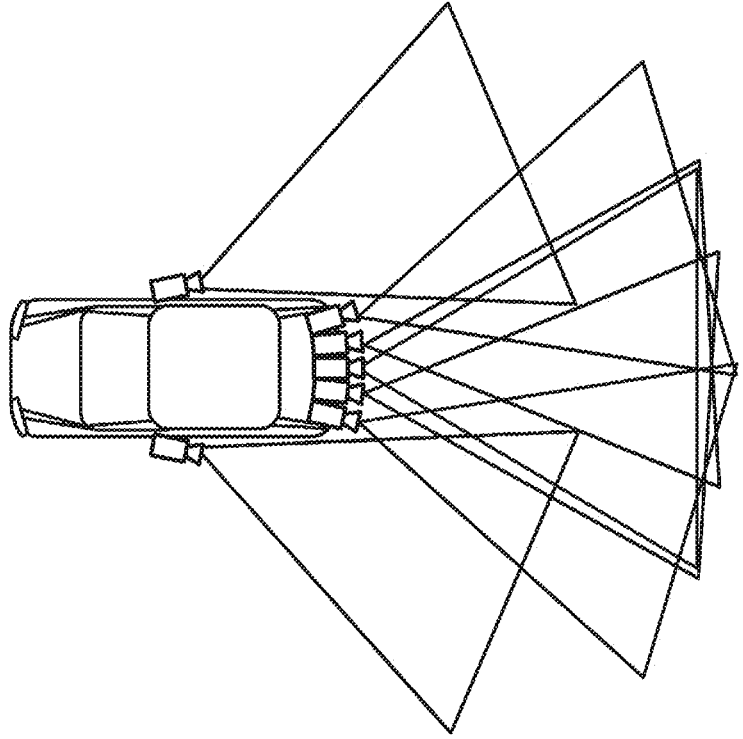
(a) EXAMPLE OF REAR CAMERA RADIAL ARRANGEMENT

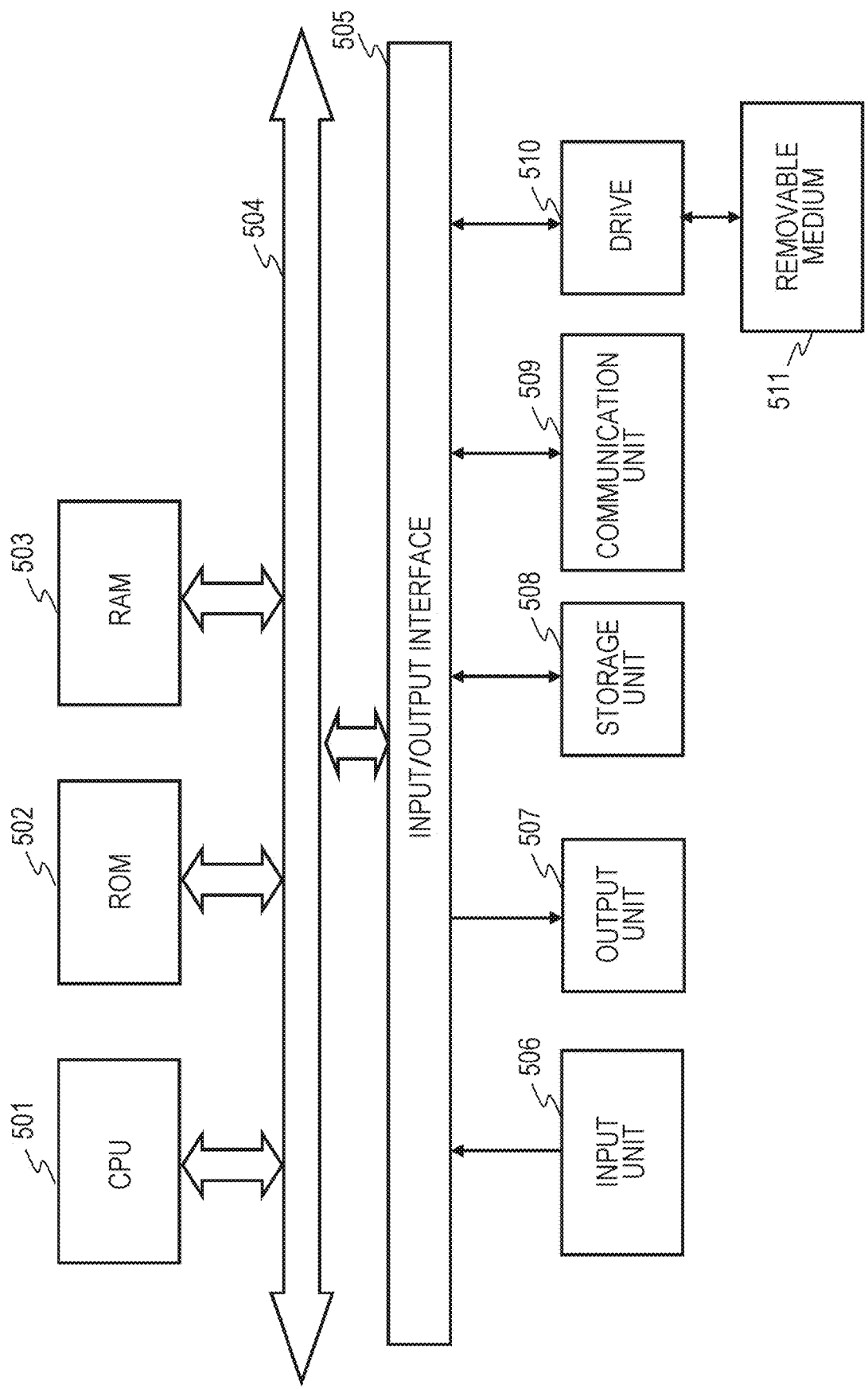

IMAGE PROCESSING APPARATUS, MOVING APPARATUS, METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/015379, filed in the Japanese Patent Office as a Receiving Office on Apr. 9, 2019, which claims priority to Japanese Patent Application Number JP2018-089667, filed in the Japanese Patent Office on May 8, 2018, each of which is hereby incorporated by reference in its entirety.

TECHNICAL FIELD

The present disclosure relates to an image processing apparatus, a moving apparatus, a method, and a program. More specifically, the present disclosure relates to an image processing apparatus, a moving apparatus, a method, and a program that controls a display image to be output to a display unit (monitor) at a driver seat on the basis of an image captured by a camera mounted in a moving apparatus such as an automobile.

BACKGROUND ART

These days, camera monitor systems (CMSs) can be mounted, and the CMSs are started to be actually introduced to automobiles. In the CMSs, an image captured by a camera mounted in an automobile is displayed on a monitor at a driver seat, and the situation around the automobile, for example, the situation of the rear (rear direction) of the automobile can be checked.

For example, Patent Document 1 (WO 2018/012299) discloses a camera monitor system (CMS) in a host vehicle. In the CMS, an image of the rear of a vehicle captured by a rear camera installed in the rear of the vehicle, images of the right rear and left rear captured by side cameras installed at rearview mirror positions on the right and left sides of the vehicle, or a composite image thereof are displayed on a display unit.

CITATION LIST

Patent Document

Patent Document 1: WO 2018/012299

SUMMARY OF THE INVENTION

Problems to be Solved by the Invention

A camera monitor system (CMS) enables a surrounding state, which has been checked with a back view mirror such as a so-called traditional rearview mirror and side mirror of a car, to be checked by using a camera captured image.

For example, three images of a rear captured image, a left rear captured image, and a right rear captured image are individually displayed on a display unit (monitor) capable of being observed by a driver. The rear captured image is captured by a rear camera that images the rear of a vehicle. The left rear captured image and a right rear captured image are respectively captured by a left side camera and a right side camera installed in the vicinity of left and right side mirror positions of the vehicle. Alternatively, a single composite image generated by appropriately synthesizing these three images is displayed on the monitor.

In a case where one continuous composite image is generated and displayed from three images captured by the rear camera and left and right side cameras in such an image display system, however, a subject captured in any of the three images sometimes disappear, and is not displayed. This is because the images captured by the three cameras of the rear camera, the L side camera, and the R side camera have different viewpoints, and this is caused by, for example, processing of conversion to an image from one viewpoint, for example, a viewpoint of the rear camera, at the time when a composite image is generated.

If a composite image is generated with respect to the viewpoint of the rear camera at the time when a composite image is generated, a subject captured by a left side camera and a right side camera, such as, for example, a motorcycle behind a large vehicle in the immediate rear and a vehicle approaching at a high speed from a distance, disappears from the composite image. This is because, for example, the motorcycle is in a region behind the large vehicle, that is, an occlusion region from the viewpoint of the rear camera.

The present disclosure has been made in view of, for example, the above-described problem, and an object of thereof is to provide an image processing apparatus, a moving apparatus, a method, and a program in which a driver can almost continuously (seamlessly) check images of the rear side observed from various viewpoints similarly to the case of checking a traditional rearview mirror and side mirror by sequentially switching and displaying images captured by a plurality of cameras having different imaging viewpoints in accordance with the behavior of the driver, for example, movements of the head.

Solutions to Problems

A first aspect of the present disclosure is in an image processing apparatus including a data processing unit that executes image display control of:

inputting driver information indicating behavior of a driver of a moving apparatus and images captured by a plurality of cameras that images a situation around the moving apparatus from different viewpoints; and switching an image output to a display unit to any of the images captured by the plurality of cameras or a virtual viewpoint composite image in accordance with the driver information.

Moreover, a second aspect of the present disclosure is in a moving apparatus including:

a plurality of cameras that images a situation around the moving apparatus from different viewpoints;

a driver information detection unit that detects driver information indicating behavior of a driver of the moving apparatus; and a data processing unit that inputs the driver information and images captured by the plurality of cameras, and switches an image output to a display unit to any of the images captured by the plurality of cameras or a virtual viewpoint composite image in accordance with the driver information.

Moreover, a third aspect of the present disclosure is in an image processing method executed in an image processing apparatus, in which a data processing unit executes image display control of:

inputting driver information indicating behavior of a driver of a moving apparatus and images captured by a plurality of cameras that images a situation around the moving apparatus from different viewpoints; and switching an image output to a display unit to any of the images captured by the plurality of cameras or a virtual viewpoint composite image in accordance with the driver information.

Moreover, a fourth aspect of the present disclosure is in a display image control method executed in a moving apparatus, including:

an image capturing step in which a plurality of cameras images a situation around the moving apparatus from different viewpoints;

a driver information detection step in which a driver information detection unit detects driver information indicating behavior of a driver of the moving apparatus; and an image display control step in which a data processing unit inputs the driver information and images captured by the plurality of cameras, and switches an image output to a display unit to any of the images captured by the plurality of cameras or a virtual viewpoint composite image in accordance with the driver information.

Moreover, a fifth aspect of the present disclosure is in a program for executing image processing in an image processing apparatus, causing a data processing unit to execute image display control of:

inputting driver information indicating behavior of a driver of a moving apparatus and images captured by a plurality of cameras that images a situation around the moving apparatus from different viewpoints; and switching an image output to a display unit to any of the images captured by the plurality of cameras or a virtual viewpoint composite image in accordance with the driver information.

Note that the program of the present disclosure can be provided by a storage medium or a communication medium capable of providing various program codes in a computer readable format to an information processing apparatus and a computer system capable of executing various program codes. Processing in accordance with a program is performed on an information processing apparatus and a computer system by providing such a program in a computer-readable format.

Other objects, features, and advantages of the present disclosure will be apparent from more detailed description based on the later-described embodiments of the present disclosure and the accompanying drawings. Note that a system in the specification has configuration of a logical set of a plurality of apparatuses. The system is not limited to a system in which apparatuses having each configuration are placed in the same housing.

Effects of the Invention

According to the configuration of one embodiment of the present disclosure, configuration, in which images output to a display unit are switched and displayed in accordance with the behavior of a driver, such as movements of the head of the driver, is achieved.

Specifically, for example, driver information indicating the behavior of a driver of a moving apparatus and images captured by a plurality of cameras that images the situation around the moving apparatus from different viewpoints are input. Images output to the display unit are switched in accordance with driver information. The plurality of cameras is, for example, a plurality of rear cameras installed in the rear of the moving apparatus. For example, a direction of the face or line-of-sight of the driver is detected. An image in a direction corresponding to the detected direction of the face or line-of-sight of the driver is selected as an output image, and displayed on the display unit. Alternatively, an image in a direction indicated by a gesture of the driver is selected, and displayed on the display unit.

The configuration achieves configuration in which images output to the display unit are switched and displayed in accordance with the behavior of the driver, such as movements of the head of the driver.

Note that the effects described in the specification are merely illustration and not limitation, and additional effects may be exhibited.

BRIEF DESCRIPTION OF DRAWINGS

FIG. 11 illustrates an example of the image display on the display unit.

FIG. 22 illustrates an example of camera arrangement in the moving apparatus.

FIG. 25 illustrates an example of the hardware configuration of the image processing apparatus.

MODE FOR CARRYING OUT THE INVENTION

Details of an image processing apparatus, a moving apparatus, a method, and a program of the present disclosure will be described below with reference to the drawings. Note that the description will be given in accordance with the following items.
1. Outline of In-vehicle Camera Monitor System (CMS)
2. Configuration Example of Image Processing Apparatus and Moving Apparatus of Present Disclosure
3. Other Embodiments
4. Image Processing Apparatus and Sequence of Processing Executed by Moving Apparatus
5. Configuration Example of Image Processing Apparatus
6. Summary of Configuration of Present Disclosure 1. Outline of In-vehicle Camera Monitor System (CMS)

Figure 1:
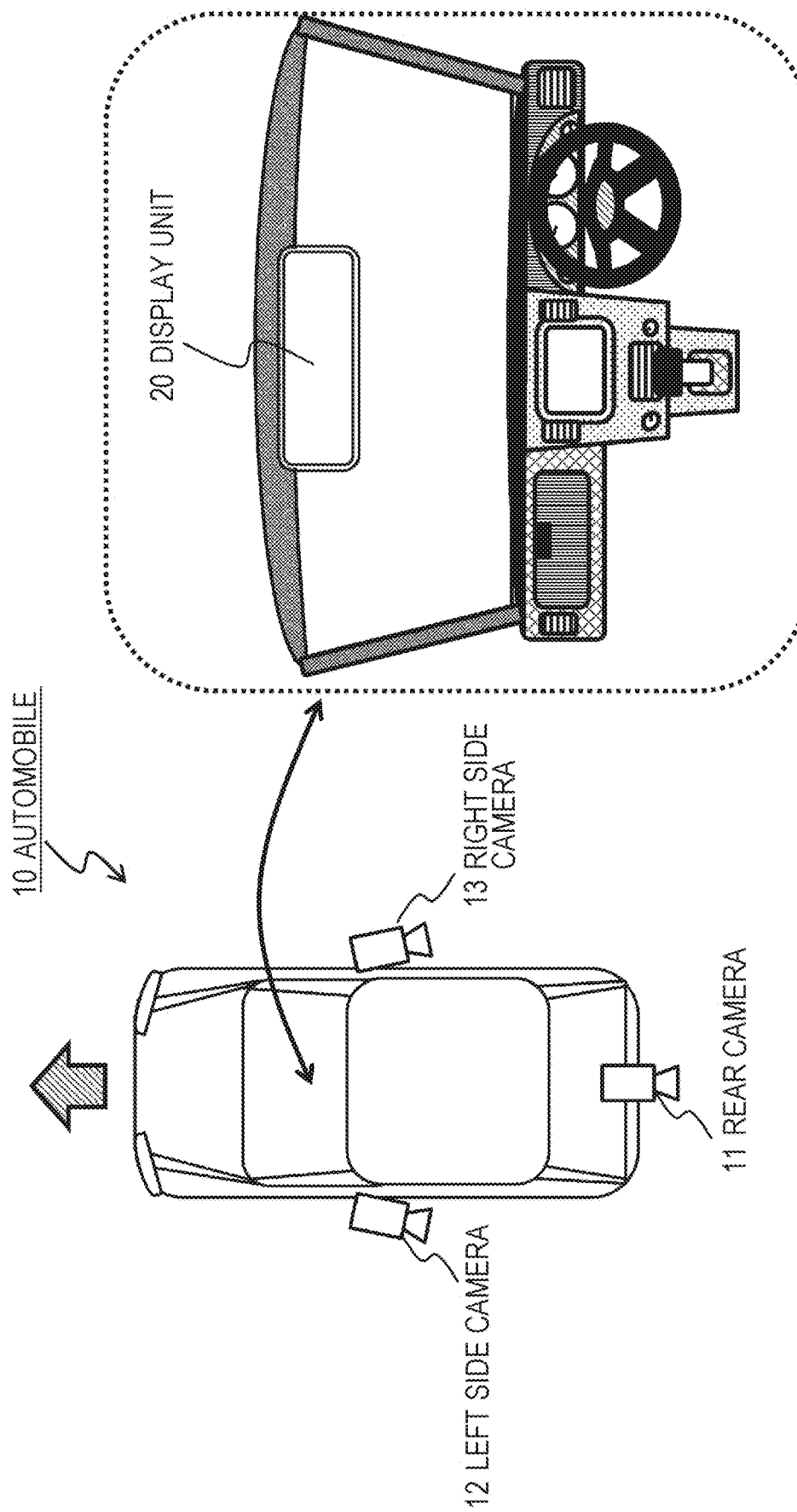
FIG. 1 outlines a camera monitor system (CMS) mounted in an automobile.

First, a camera monitor system (CMS) mounted in an automobile will be outlined with reference to FIG. 1 and subsequent figures.

FIG. 1 outlines a CMS mounted in an automobile 10. The CMS displays an image captured by a camera installed on an automobile on a display unit that a driver can observe.

The automobile 10 in FIG. 1 includes a rear camera 11, a left side camera 12, and a right side camera 13. The rear camera 11 is installed in the rear of the automobile 10. The left side camera 12 is installed on the left side of the automobile 10. The right side camera 13 is installed on the right side of the automobile 10. Each of these cameras captures an image behind the automobile 10, observed from the installation position of each camera.

Images captured by these cameras or a composite image generated on the basis of these captured images are displayed on a display unit 20 inside the automobile 10. A driver of the automobile 10 can check the state behind the automobile 10 by looking at a display image on the display unit 20.

Figure 2:
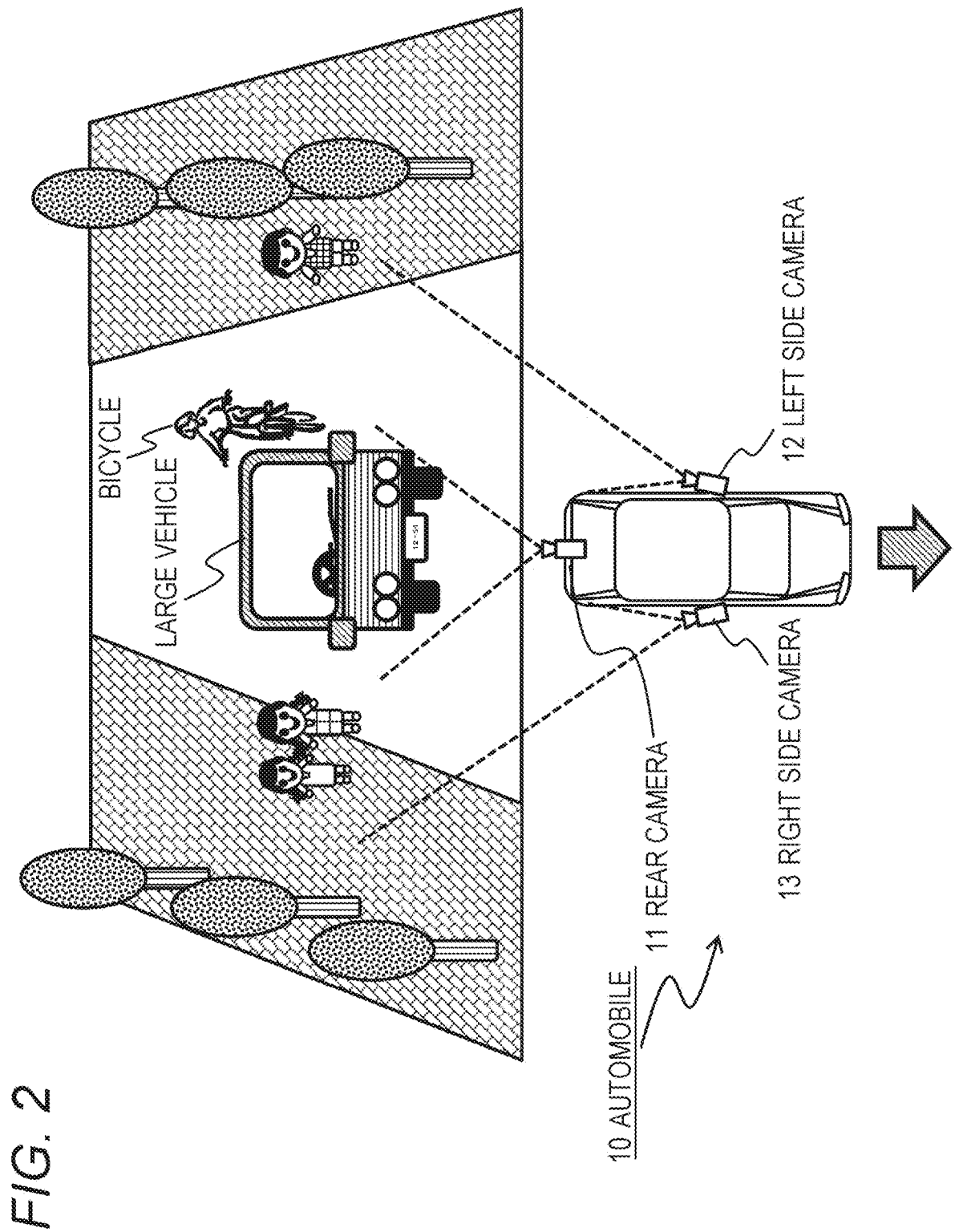
FIG. 2 illustrates an example of usage of the CMS.

A specific image example displayed on the display unit 20 will be described with reference to FIG. 2 and subsequent figures. FIG. 2 illustrates the state behind the automobile 10. In FIG. 2, the automobile 10 is traveling in a direction of an arrow (forward) in the figure.

In this state, the three cameras of the rear camera 11, the left side camera 12, and the right side camera 13 capture an image with each camera position as a viewpoint position.

Figure 3:
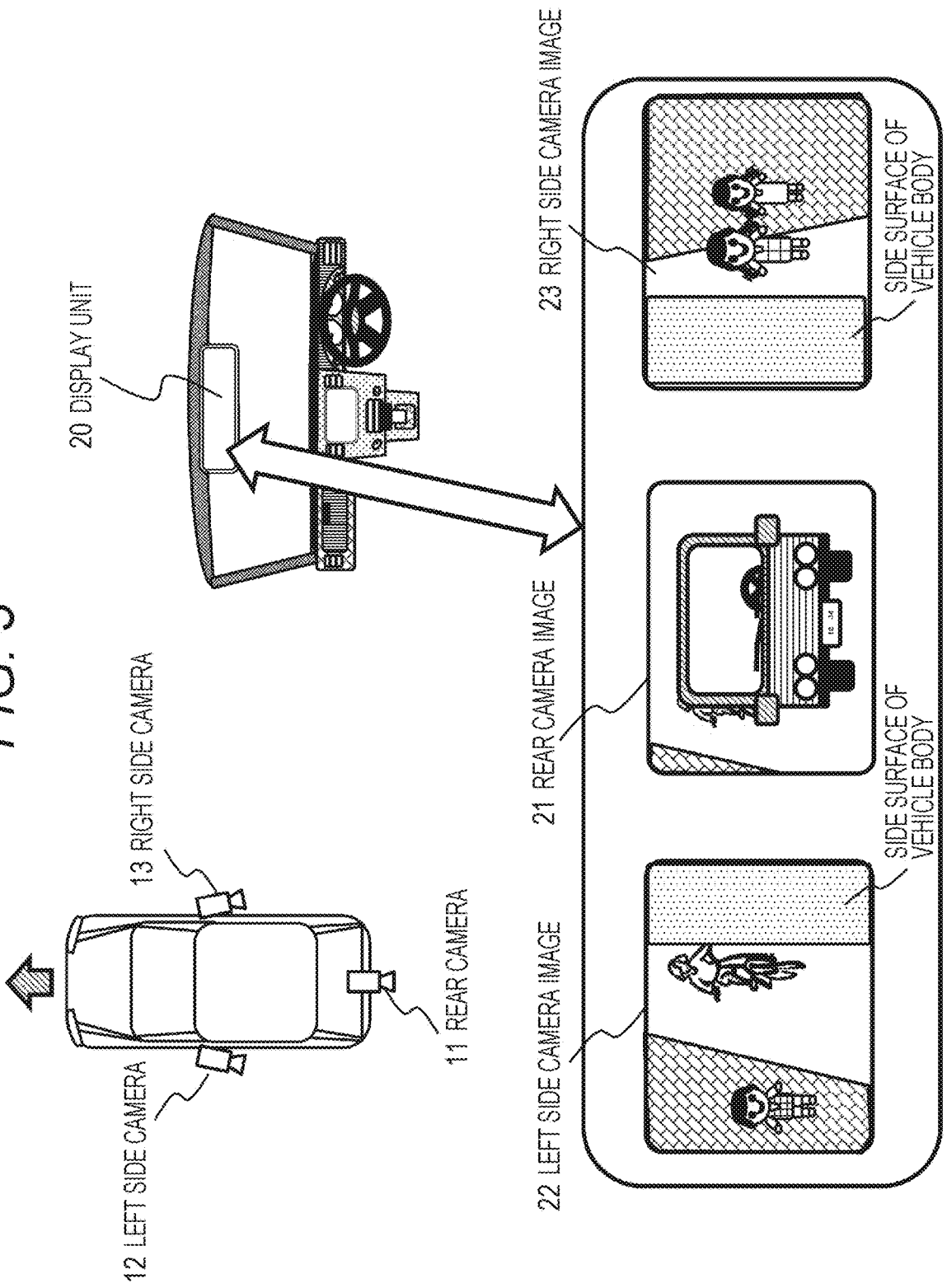
FIG. 3 illustrates an example of usage of the CMS.

FIG. 3 illustrates examples of images, which the driver of the automobile 10 can check, displayed on the display unit 20. FIG. 3 illustrates an example in which images captured by three cameras of the rear camera 11, the left side camera 12, and the right side camera 13 are individually displayed on the display unit 20. On the display unit 20, a rear camera image 21 captured by the rear camera 11 is displayed in the center of the display unit 20, a left side camera image 22 captured by the left side camera 12 is displayed on the left side of the display unit 20, and a right side camera image 23 captured by the right side camera 13 is displayed on the right side of the display unit 20.

The driver can check the surrounding situation in a manner similar to the case of looking at a rearview mirror and right and left side mirrors by looking at these three images.

In a case where three images are displayed side by side in this way, however, the driver mainly pays attention only to the central image corresponding to the rearview mirror. If the driver is not careful of the right and left images, the driver tends to overlook information mainly reflected in the right and left images.

In the example in FIG. 3, a bicycle reflected in the left side camera image 22 is hidden behind a large vehicle in the central rear camera image 21, and almost invisible. In such a case, if the driver pays attention only to the rear camera image 21 displayed in the center of the display unit 20, the driver is at risk of being unaware of the bicycle.

Figure 4:
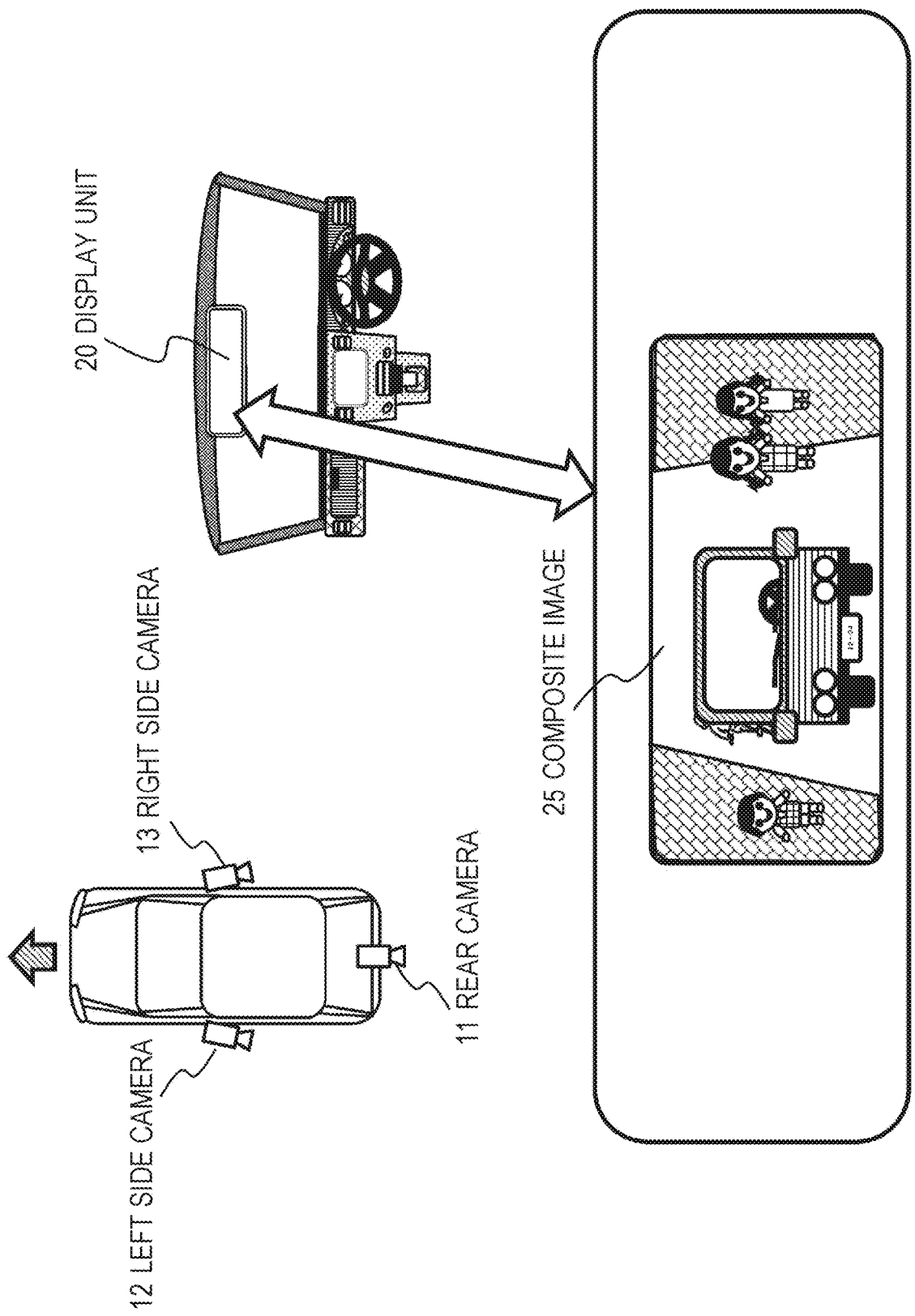
FIG. 4 illustrates an example of usage of the CMS.

Although FIG. 3 illustrates an example in which images captured by the cameras are individually displayed on the display unit 20, a configuration, in which a composite image is generated by combining these three images to one image and displayed on the display unit 20, has been proposed and used. FIG. 4 illustrates an example of display of a composite image.

FIG. 4 illustrates one example of a composite image 25 displayed on the display unit 20. The composite image 25 is generated with the viewpoint of the rear camera 11 as a reference. The rear camera 11, the left side camera 12, and the right side camera 13 capture images from different viewpoints, so that, for example, processing of converting a viewpoint position of each image, processing of converting the size of an object (subject), and processing of adjusting a position are necessary for generating one composite image. Specifically, image conversion processing such as, for example, affine transformation is performed.

Multiple images are joined by such image conversion processing to generate one composite image. FIG. 4 illustrates an example of a composite image generated by converting images captured by the left side camera 12 and the right side camera 13 into a captured image from the viewpoint of the rear camera 11. In a case where such a composite image is generated, however, a subject captured by the left side camera or the right side camera may disappear.

Although the bicycle serving as a subject can be clearly confirmed in the above-described left side camera image 22 in FIG. 3, the bicycle is hidden behind the vehicle, and almost invisible in the composite image 25 in FIG. 4. This is because the bicycle is in a region behind the large vehicle in front of the vehicle, that is, an occlusion region from the viewpoint of the rear camera.

The driver cannot confirm the bicycle approaching from behind even if looking at the composite image 25. If the driver drives in a manner of, for example, suddenly turning left, an accident such as contact against the bicycle approaching from behind may occur.

2. Configuration Example of Image Processing Apparatus and Moving Apparatus of Present Disclosure Next, a configuration example of the image processing apparatus and the moving apparatus of the present disclosure will be described with reference to FIG. 4 and subsequent figures. The present disclosure solves the problem described with reference to FIG. 4, for example. Specifically, for example, images captured by a plurality of cameras having different imaging viewpoints are sequentially switched and displayed in accordance with the behavior of a driver, such as, for example, movements of a head, face, and line-of-sight.

Figure 5:
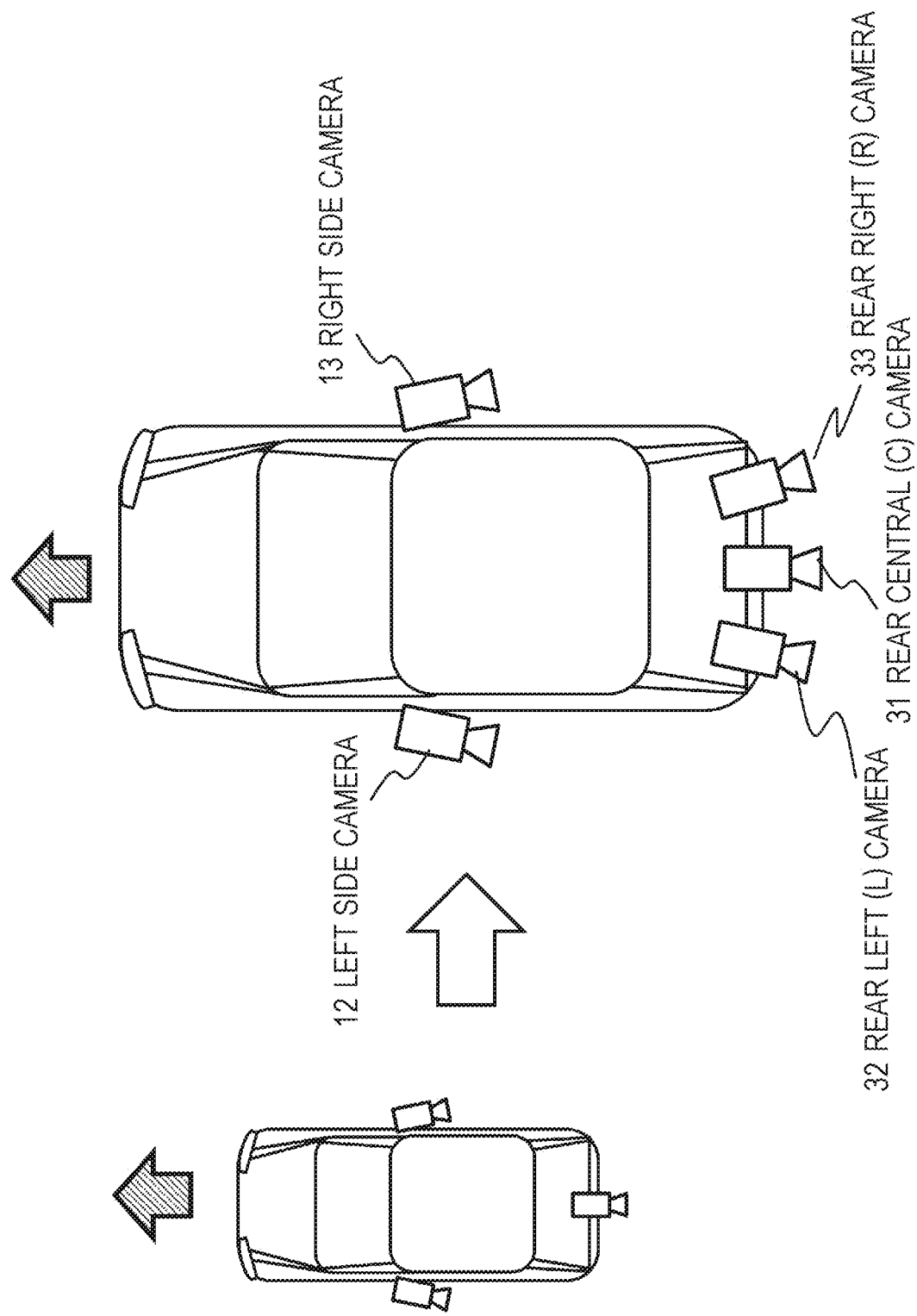
FIG. 5 illustrates the configuration of a moving apparatus and an image processing apparatus of the present disclosure and processing therein.

FIG. 5 illustrates one configuration example of the automobile 10 (moving apparatus) of the present disclosure. The automobile 10 in FIG. 5 includes the left side camera 12 on the left side of the automobile 10 and the right side camera 13 on the right side of the automobile 10, in a manner similar to that described above with reference to FIG. 1. Three rear cameras, that is, a rear central (C) camera 31, a rear left (L) camera 32, and a rear right (R) camera 33 are installed in the rear of the automobile 10. The rear C camera 31 is installed in the center of the rear of the automobile 10. The rear L camera 32 is installed on the left side of the rear of the automobile 10. The rear R camera 33 is installed on the right side of the rear of the automobile 10.

Note that, although three cameras are installed in the rear of the automobile 10 in the example, a plurality of various cameras other than three can be used. An example of using three or more multiple cameras will be described later.

Figure 6:
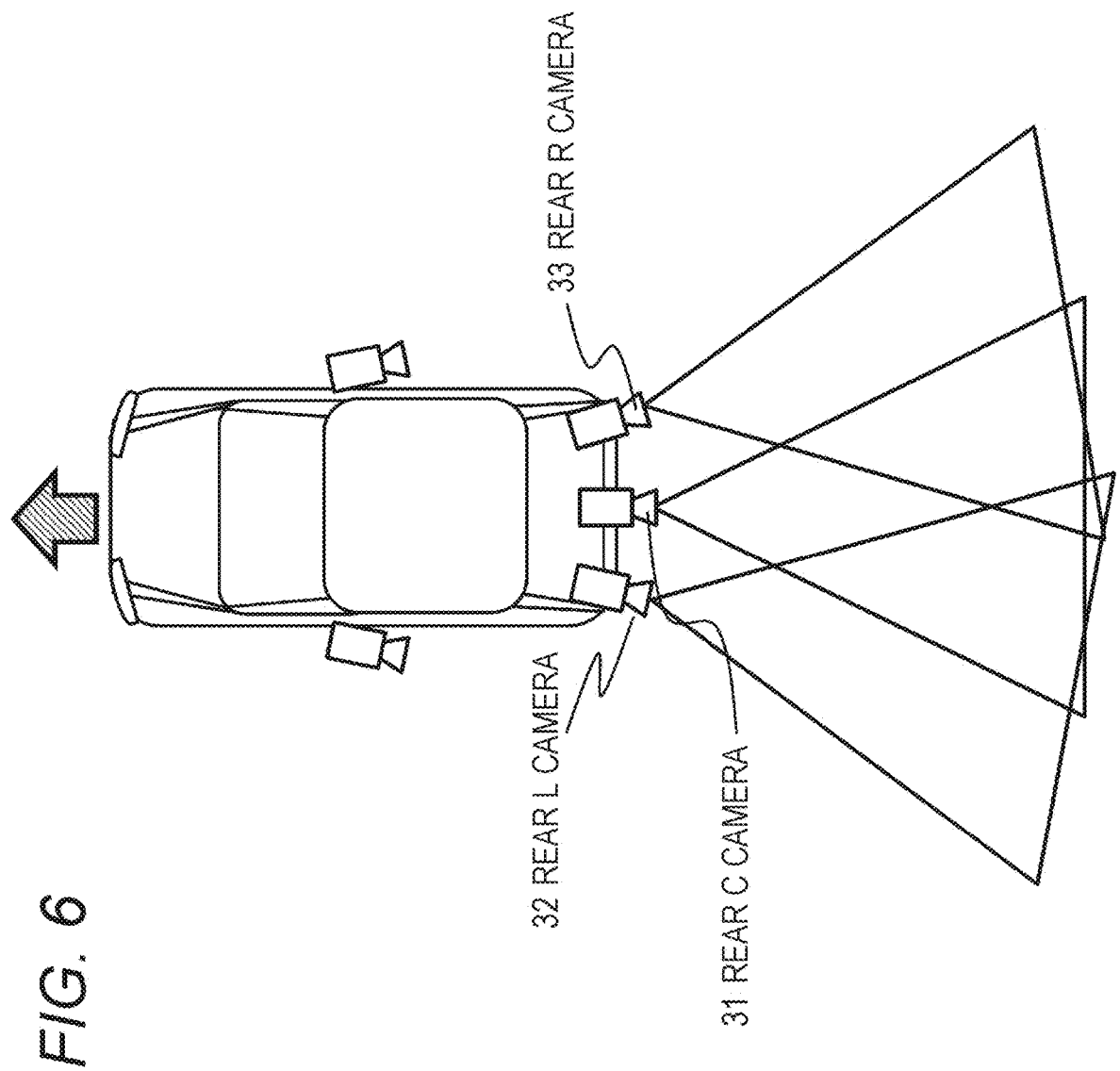
FIG. 6 illustrates the configuration of the moving apparatus and the image processing apparatus of the present disclosure and the processing therein.

FIG. 6 illustrates an example of imaging regions of three cameras installed in the rear of the automobile 10. FIG. 6 illustrates the imaging regions of three cameras of the rear central (C) camera 31, the rear left (L) camera 32, and the rear right (R) camera 33. The rear C camera 31 is installed in the center of the rear of the automobile 10. The rear L camera 32 is installed on the left side of the rear of the automobile 10. The rear R camera 33 is installed on the right side of the rear of the automobile 10.

As illustrated in FIG. 6, the three cameras have setting in which the rear of the automobile is imaged from different viewpoints, and parts of the imaging region overlap with each other. In the configuration of the present disclosure, images captured by a plurality of cameras having such different imaging viewpoints are sequentially switched and displayed in accordance with the behavior of the driver, for example, movements of the head. The movements of the head are detected for detecting a movement comparable to action and motion of the driver at the time of looking at a traditional rearview mirror and side mirror and using the sign as a trigger for switching display.

Figure 7:
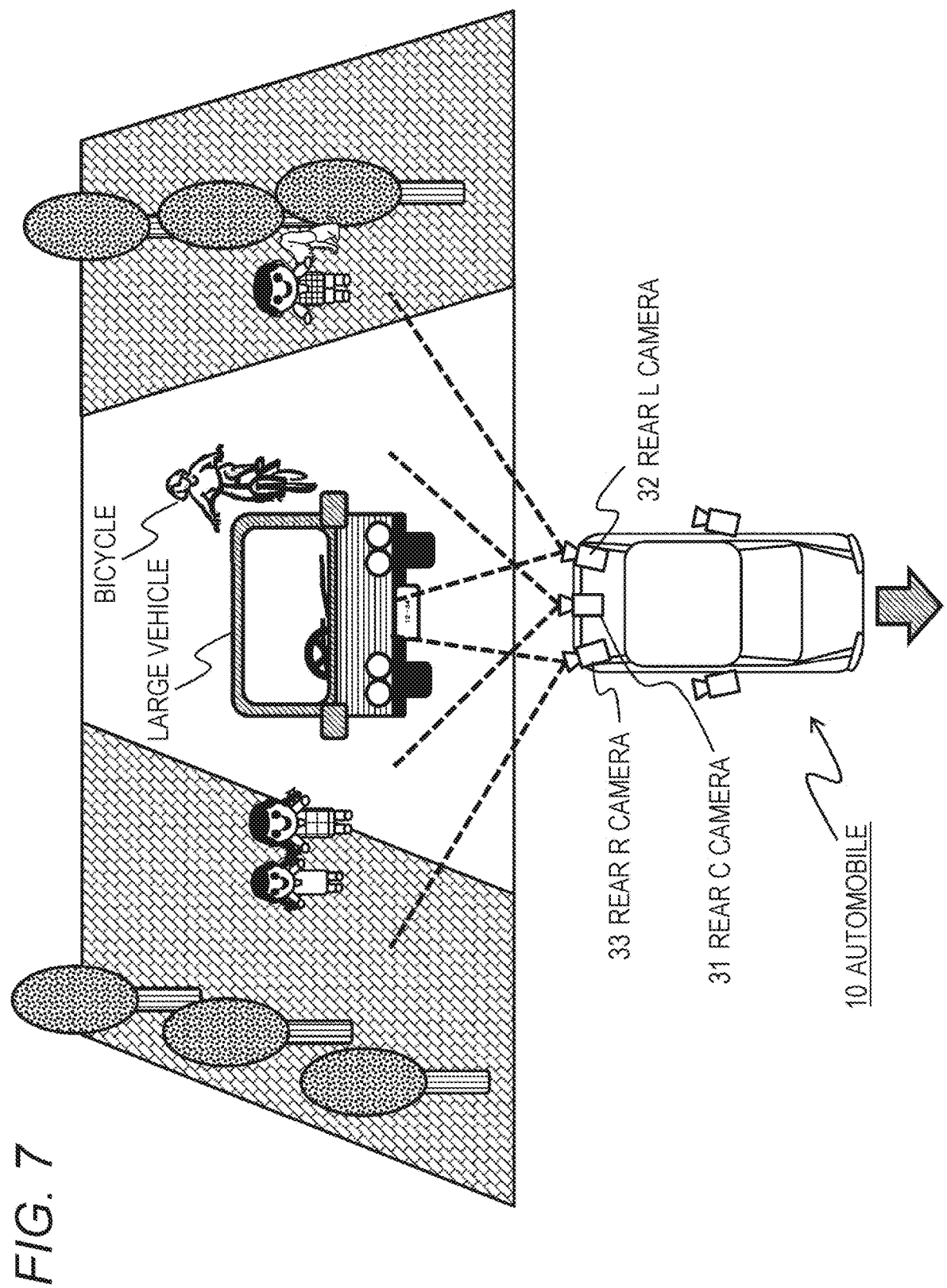
FIG. 7 illustrates the configuration of the moving apparatus and the image processing apparatus of the present disclosure and the processing therein.

FIG. 7 illustrates an imaging environment similar to that in FIG. 2 described above. The automobile 10 is traveling in the direction of an arrow (forward) in the figure.

A large vehicle is traveling behind the automobile 10, and a bicycle is traveling in the left rear of the large vehicle.

Figure 8:
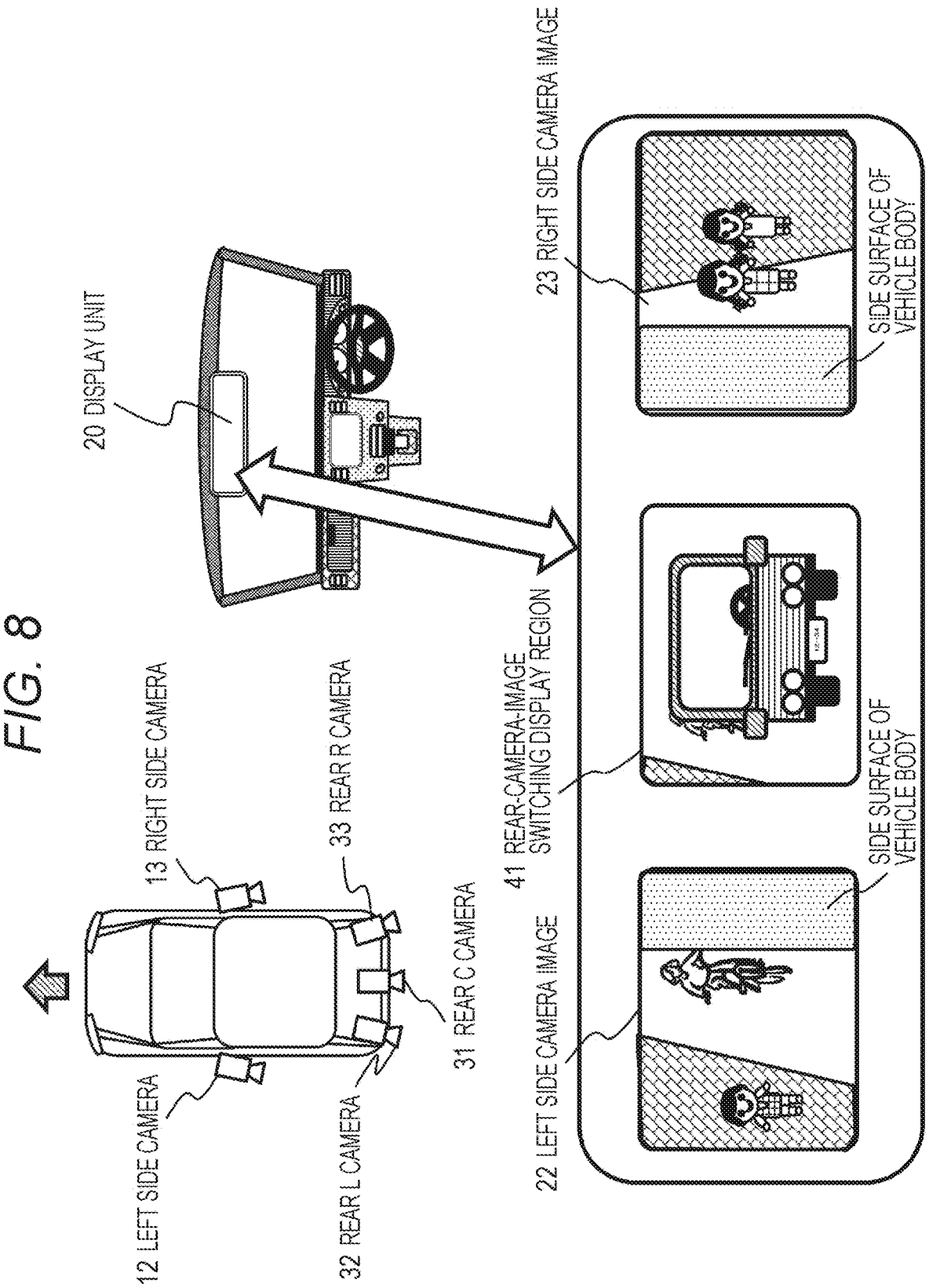
FIG. 8 illustrates an example of image display on a display unit.

FIG. 8 illustrates examples of images, which the driver of the automobile 10 can check, displayed on the display unit 20. The left side camera image 22 captured by the left side camera 12 is displayed on the left side of the display unit 20. The right side camera image 23 captured by the right side camera 13 is displayed on the right side of the display unit 20.

An image display region in the central part of the display unit 20 is set as a rear-camera-image switching display region 41. Images captured by three cameras, that is, the rear central (C) camera 31, the rear left (L) camera 32, and the rear right (R) camera 33, installed in the rear of the automobile 10 are sequentially switched and displayed on the rear-camera-image switching display region 41 in accordance with the behavior of the driver, for example, movements of the head. The rear C camera 31 is installed in the center of the rear of the automobile 10. The rear L camera 32 is installed on the left side of the rear of the automobile 10. The rear R camera 33 is installed on the right side of the rear of the automobile 10.

An example of image display on the rear-camera-image switching display region 41, that is, an image switching display example will be described with reference to FIG. 9.

Figure 9:
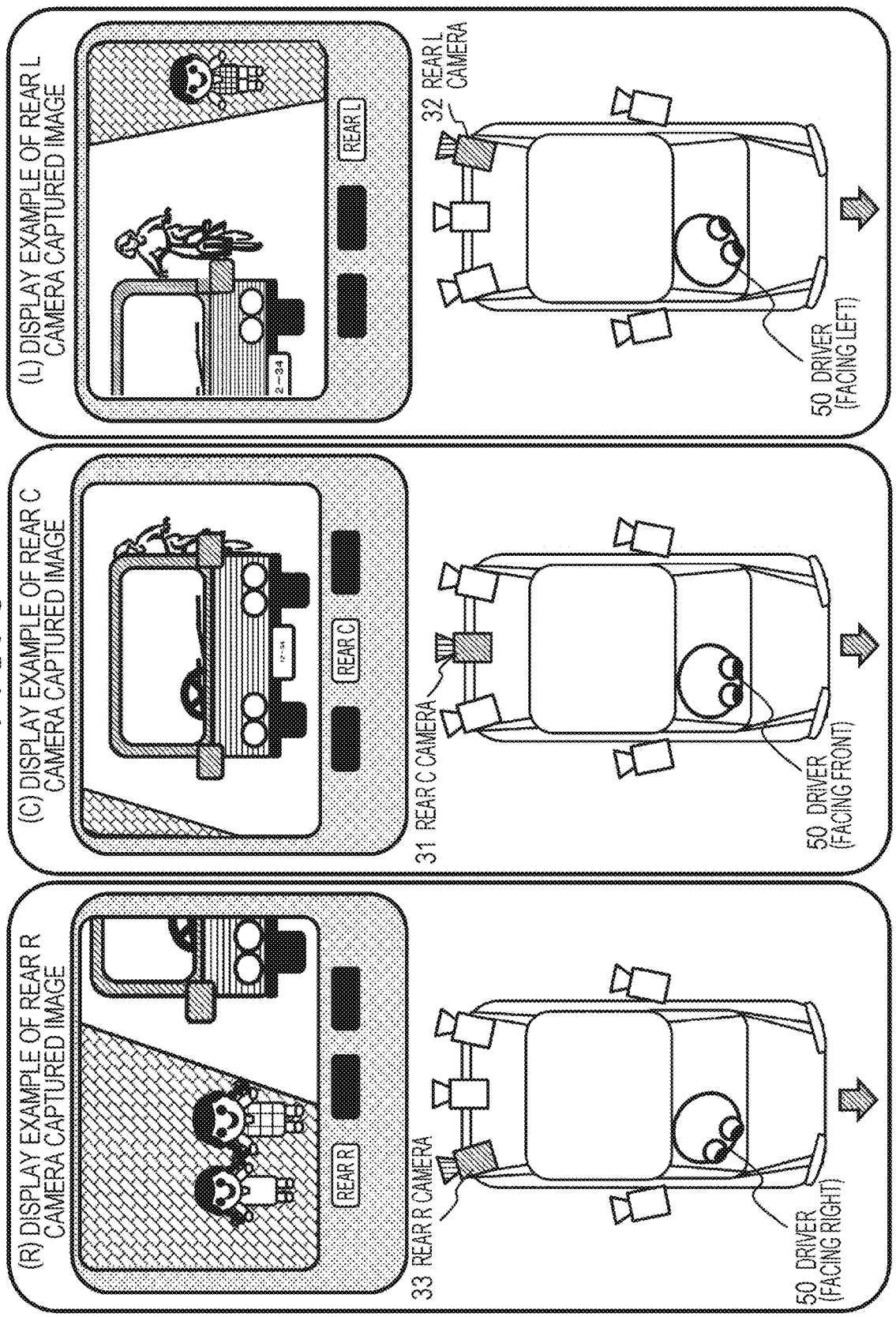
FIG. 9 illustrates an example of the image display on the display unit.

FIG. 9 illustrates correspondence data between movements of the head of a driver 50 (direction of the face or line-of-sight) and the example of image display on the rear-camera-image switching display region 41. Three examples of image display are given below.

(R) Display Example of Rear R Camera Captured Image
(C) Display Example of Rear C Camera Captured Image
(L) Display Example of Rear L Camera Captured Image FIG. 9 illustrates (R) display example of a rear R camera captured image in a case where the face or line-of-sight of the driver 50 is in the right direction. In this way, in a case where the driver 50 of the automobile 10 looks at the right, an image captured by the rear right (R) camera 33, which is installed on the right side of the rear of the automobile 10, is displayed on the rear-camera-image switching display region 41 of the display unit 20.

Furthermore, FIG. 9 illustrates (C) display example of a rear C camera captured image in a case where the face or line-of-sight of the driver 50 is substantially in the front direction. In this way, in a case where the driver 50 of the automobile 10 looks at the front, an image captured by the rear central (C) camera 31, which is installed in the center of the rear of the automobile 10, is displayed on the rear-camera-image switching display region 41 of the display unit 20.

Moreover, FIG. 9 illustrates (L) display example of a rear L camera captured image in a case where the face or line-of-sight of the driver 50 is in the left direction. In this way, in a case where the driver 50 of the automobile 10 looks at the left, an image captured by the rear left (L) camera 32, which is installed on the left side of the rear of the automobile 10, is displayed on the rear-camera-image switching display region 41 of the display unit 20.

Note that, in a case where the driver 50 exhibits behavior of, for example, first looking at the right, then looking at the front, and finally looking at the left, display images on the rear-camera-image switching display region 41 of the display unit 20 are sequentially switched as follows. First, an image captured by the rear right (R) camera 33 is displayed, switched to an image captured by the rear central (C) camera 31, and then switched to display an image captured by the rear left (L) camera 32.

A driver information detection unit that detects the behavior of the driver 50 is installed in the automobile 10. An image processing apparatus of the automobile 10 performs control to switch display images on the display unit 20 on the basis of detection information from the driver information detection unit.

An image of a bicycle can be clearly confirmed in (L) display example of the rear L camera captured image described on the left side among three images in FIG. 9. This is because the rear left (L) camera 33 captures an image from the left side of the rear of the automobile 10, and can capture an image of the bicycle that is not hidden behind the large vehicle in front of the bicycle.

The driver 50 can clearly confirm that the bicycle is behind the large vehicle by looking at the image.

Note that, although each image in FIG. 9 may be displayed on a central region between the left side camera image 22 and the right side camera image 23 together with these two images as in the display example of the display unit 20 described above with reference to FIG. 8, only an image in FIG. 9 may be independently displayed on the display unit 20 in accordance with the direction of the face or line-of-sight of the driver 50 without displaying the left side camera image 22 and the right side camera image 23.

Note that FIG. 9 illustrates setting of switching display images on the display unit 20, that is, images on the rear-camera-image switching display region 41, which is a central region of the display unit 20 in FIG. 8, in accordance with the direction of the face or line-of-sight of the driver 50, the position of the rear-camera-image switching display region 41 may be changed in accordance with the direction of the face or line-of-sight of the driver 50, for example. That is, the position of the rear-camera-image switching display region 41 is changed to a position that matches the direction of the face or line-of-sight of the driver 50.

Figure 10:
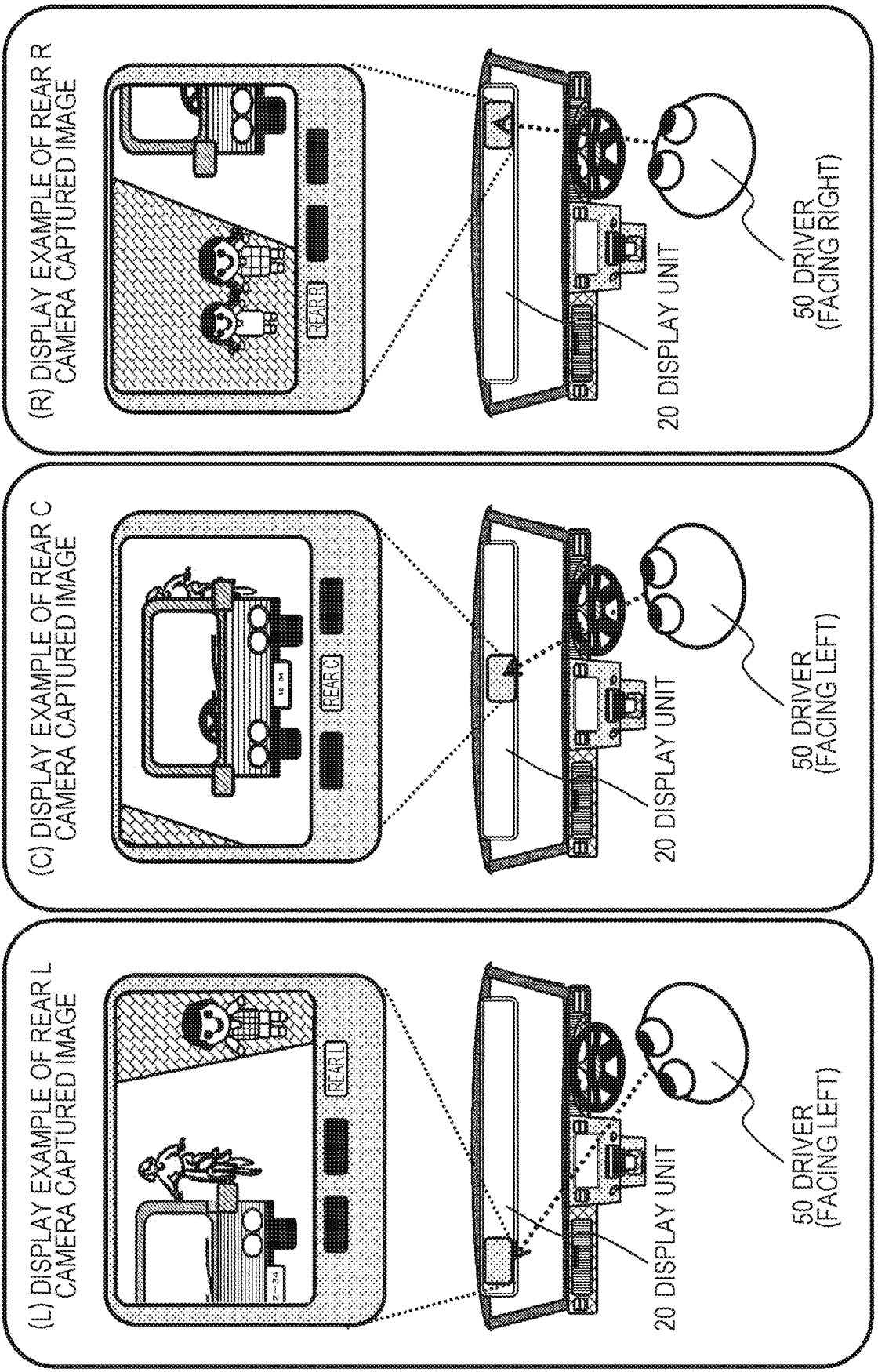
FIG. 10 illustrates an example of the image display on the display unit.

The image position change display example will be described with reference to FIG. 10. Similarly to FIG. 9, FIG. 10 illustrates correspondence data between movements of the head of a driver 50 (direction of the face or line-of-sight) and the example of image display on the rear-camera-image switching display region 41. Three examples of image display are given below.

(R) Display Example of Rear R Camera Captured Image
(C) Display Example of Rear C Camera Captured Image
(L) Display Example of Rear L Camera Captured Image The display unit 20 in FIG. 10 is set on an upper part of a front panel of an automobile, and has a display region that is long in the right and left direction.

FIG. 10 illustrates (L) display example of the rear L camera captured image in a case where the face or line-of-sight of the driver 50 is in the left direction. In a case where the driver 50 looks at the left, an image captured by the rear left (L) camera 32, which is installed on the left side of the rear of the automobile 10, is displayed on a left end part of the display unit.

Furthermore, FIG. 10 illustrates (C) display example of the rear C camera captured image in a case where the face or line-of-sight of the driver 50 is substantially in the front direction. In a case where the driver 50 looks at the front, an image captured by the rear central (C) camera 31, which is installed in the center of the rear of the automobile 10, is displayed in the central part of the display unit.

Furthermore, FIG. 10 illustrates (R) display example of the rear R camera captured image in a case where the face or line-of-sight of the driver 50 is in the right direction. In a case where the driver 50 looks at the right, an image captured by the rear right (R) camera 33, which is installed on the right side of the rear of the automobile 10, is displayed on a right end part of the display unit.

FIG. 10 illustrates an example in which the position of the rear-camera-image switching display region 41 is changed to a position that matches the direction of the face or line-of-sight of the driver 50. Such display position control allows the driver 50 to display an image which the driver 50 wants to see in the direction of line-of-sight of his/her own. Consequently, the driver 50 can certainly confirm the image in the direction in which the driver 50 is paying attention, while keeping the line-of-sight in the direction.

Note that the control of the image display position is also executed on the basis of the detection information from the driver information detection unit, which detects the behavior of the driver 50, installed in the automobile 10.

Moreover, separately from the direction of the face or line-of-sight of the driver 50, display images may be changed in accordance with indication with, for example, a head movement sequence, a hand, or a finger of the driver 50.

An example of the configuration in which display images are changed in accordance with indication with the hand or finger of the driver 50 will be described with reference to FIG. 11.

FIG. 11 illustrates (L) display example of the rear L camera captured image in a case where a finger of driver 50 indicates the left direction. In a case where the finger of the driver 50 indicates the left, an image captured by the rear left (L) camera 32, which is installed on the left side of the rear of the automobile 10, is displayed on the display unit 20.

Furthermore, FIG. 11 illustrates (C) display example of the rear C camera captured image in a case where the finger of the driver indicates substantially the front. In a case where the finger of the driver 50 indicates the front, an image captured by the rear central (C) camera 31, which is installed in the center of the rear of the automobile 10, is displayed on the display unit 20.

Moreover, FIG. 11 illustrates (R) display example of the rear R camera captured image in a case where the finger of the driver 50 indicates the right. In a case where the finger of the driver 50 indicates the right, an image captured by the rear right (R) camera 33, which is installed on the right side of the rear of the automobile 10, is displayed on the display unit 20.

FIG. 11 illustrates an example in which images displayed on the rear-camera-image switching display region 41 are changed in accordance with indication (gesture) with a hand or finger of the driver 50. Note that the motion sequence of a head may be detected as a gesture. Such control enables the driver 50 to change images without significantly changing the line-of-sight direction.

Figure 12:
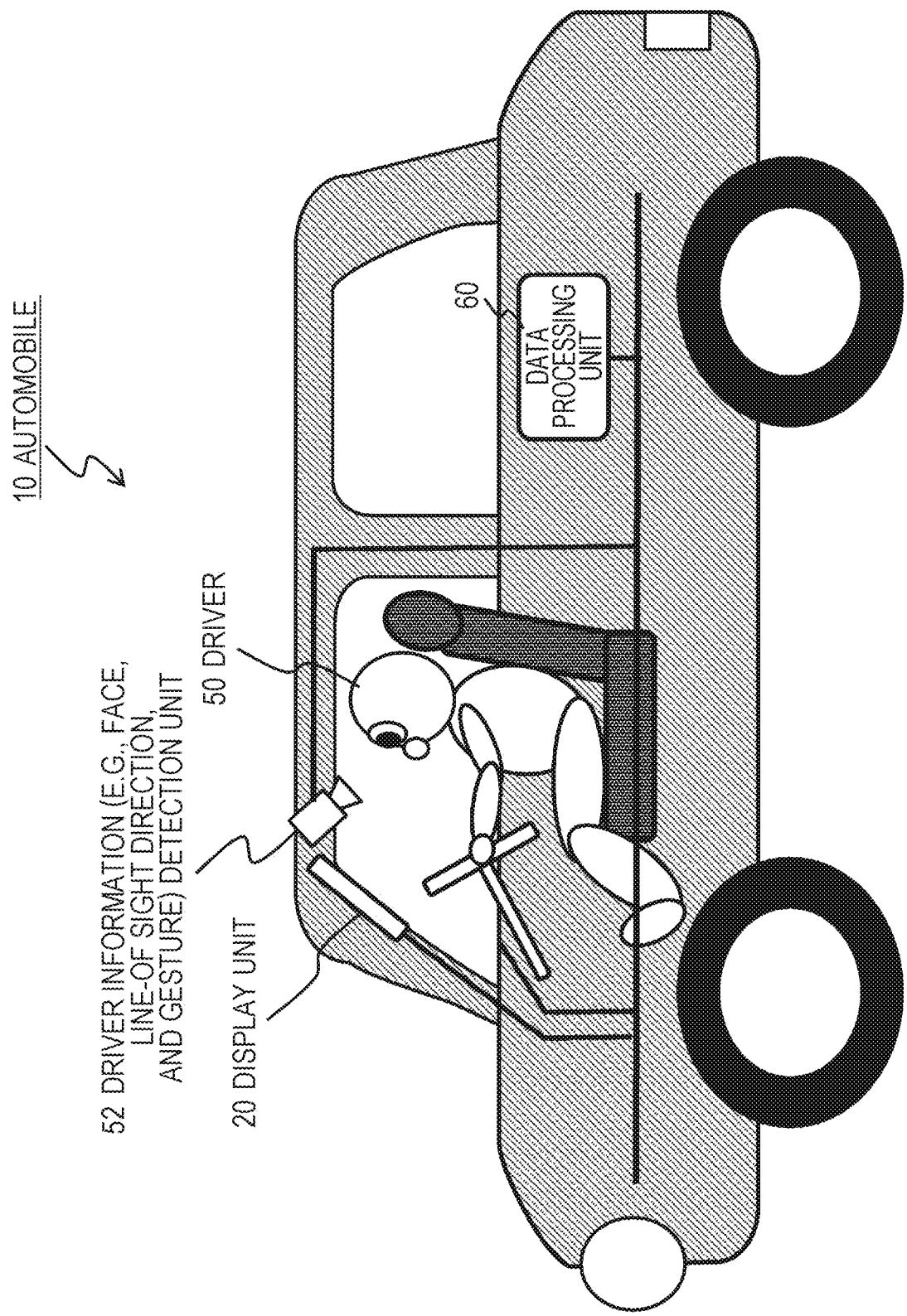
FIG. 12 illustrates the configuration of the moving apparatus and the image processing apparatus and the processing therein.

FIG. 12 illustrates a configuration example for image switching display control provided in the automobile 10, which is a moving apparatus. As illustrated in FIG. 12, the automobile 10 includes a driver information detection unit 52 that detects the direction of the face or line-of-sight of the driver 50 or indication (gesture) with a hand or finger. Specifically, the driver information detection unit 52 includes, for example, a camera or a movement sensor. The detection information from the driver information detection unit 52 is input to a data processing unit 60.

The data processing unit 60 performs processing of switching images displayed on the display unit 20, and changes a display position on the basis of the detection information from the driver information detection unit 52.

Figure 13:
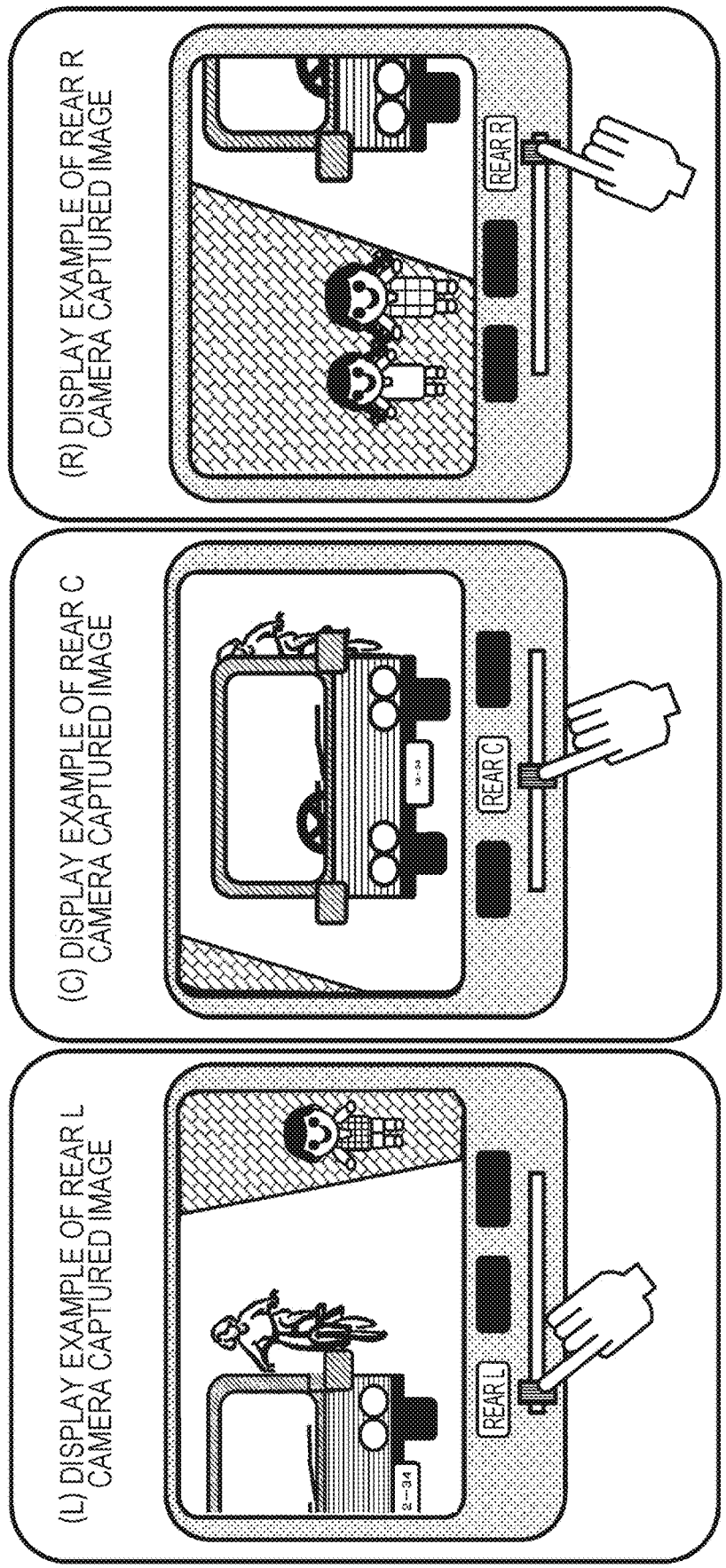
FIG. 13 illustrates an example of the image display on the display unit.

Note that a user (driver 50) may perform operation of switching images displayed on the display unit 20. For example, as illustrated in FIG. 13, for example, a user operation unit may be displayed on an operation unit set in the vicinity of the display unit 20 or a display unit of touch panel type. The user may operate the operation unit to switch display images.

(L) display example of the rear L camera captured image in FIG. 13 is an example of a display image on the display unit 20 in a case where the user moves the operation unit to the left. In this case, an image captured by the rear left (L) camera 32, which is installed on the left side of the rear of the automobile 10, is displayed on the display unit 20.

(C) display example of the rear C camera captured image is an example of a display image on the display unit 20 in a case where the user moves the operation unit to the center. In this case, an image captured by the rear central (C) camera 31, which is installed in the center of the rear of the automobile 10, is displayed on the display unit 20.

(R) display example of the rear R camera captured image is an example of a display image on the display unit 20 in a case where the user moves the operation unit to the right. In this case, an image captured by the rear right (R) camera 33, which is installed on the right side of the rear of the automobile 10, is displayed on the display unit 20.

Note that setting similar to that described above with reference to FIG. 9 can be adopted. In the setting, each image in FIGS. 9 to 13 is displayed together with the left side camera image 22 and the right side camera image 23 as the display example of the display unit 20 described above with reference to FIG. 8. Furthermore, only an image in FIGS. 9 to 13 may be independently displayed on the display unit 20 in accordance with the direction of the face or line-of-sight and indication of the driver 50 without displaying the left side camera image 22 and the right side camera image 23.

The image switching display example described with reference to FIGS. 9 to 13 is a configuration example in which images captured by three cameras of, that is, the rear left (L) camera 32, the rear central (C) camera 31, and the rear right (R) camera 33 installed in the rear of the automobile 10 are switched and displayed on the basis of the position of the head/face, line-of-sight direction, or indication of the driver.

Moreover, an image captured by the left side camera 12 and an image captured by the right side camera 13 may be added to images captured by these three cameras as a target of switching images.

The specific example will be described with reference to FIG. 14.

Figure 14:
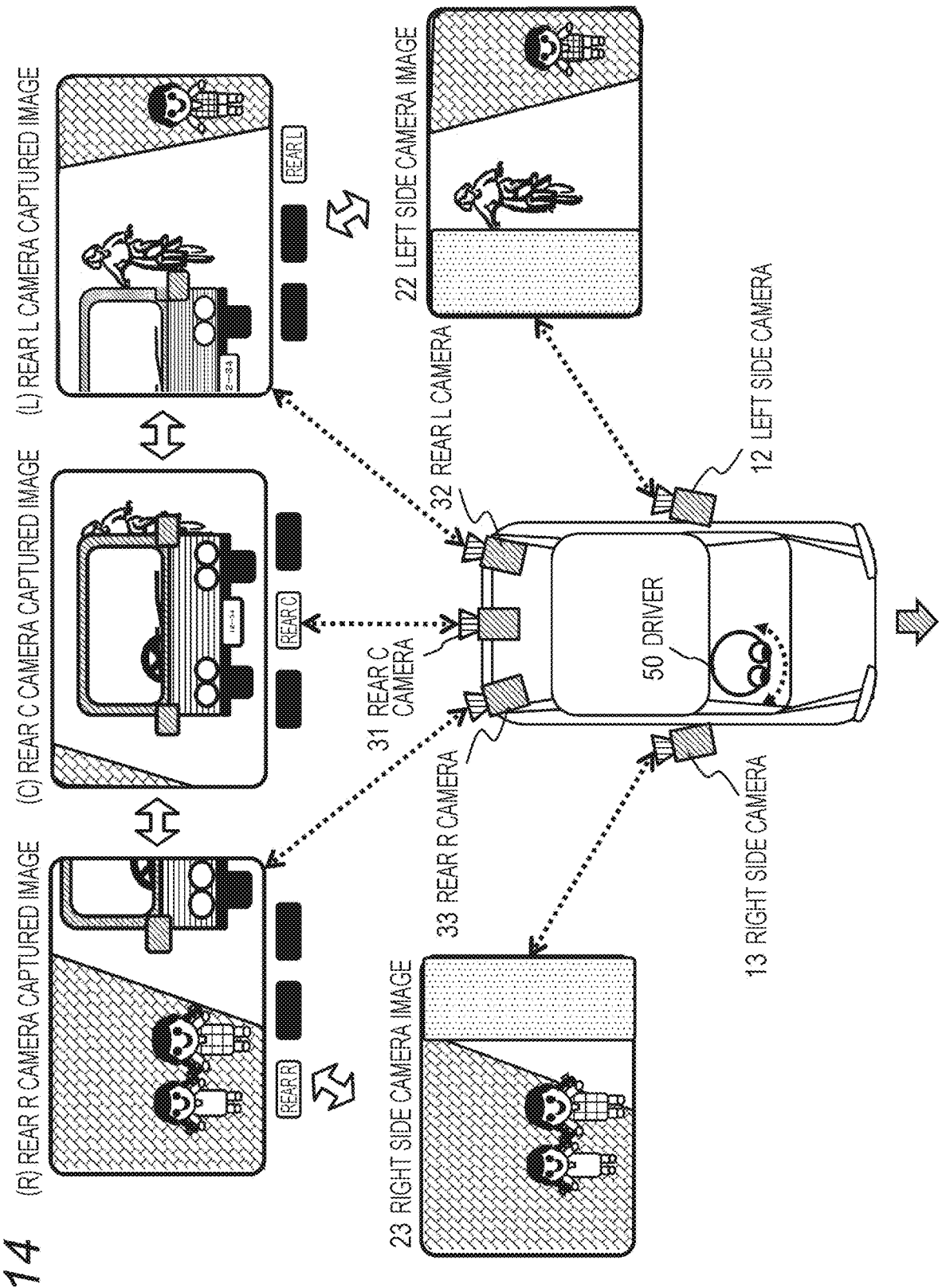
FIG. 14 illustrates an example of the image display on the display unit.

FIG. 14 illustrates an example of a display image switching sequence of the display unit 20 based on, for example, the direction of the face or line-of-sight of the driver 50, indication, or input to an operation unit.

For example, as the direction of the face or line-of-sight of the driver 50 changes from right to left, display images on the display unit 20 are sequentially switched in the following order.

(1) Right Side Camera Image Captured by Right Side Camera 13
(2) Rear R Camera Captured Image Captured by Rear R Camera 33
(3) Rear C Camera Captured Image Captured by Rear C Camera 31
(4) Rear L Camera Captured Image Captured by Rear L Camera 32
(5) Left Side Camera Captured Image Captured by Left Side Camera 12

Moreover, as the direction of the face or line-of-sight of the driver 50 changes from left to right, display images on the display unit 20 are sequentially switched in the order of (5) to (1) above.

3. Other Embodiments

The embodiment described with reference to FIGS. 5 to 14 is a configuration example in which images captured by three cameras of, that is, the rear left (L) camera 32, the rear central (C) camera 31, and the rear right (R) camera 33 installed in the rear of the automobile 10 are switched and displayed on the basis of the direction of the face or line-of-sight of a driver, gesture indication with, for example, a head, or input to the operation unit.

Any multiple number other than three of cameras can be installed in the rear of the automobile 10.

Figure 15:
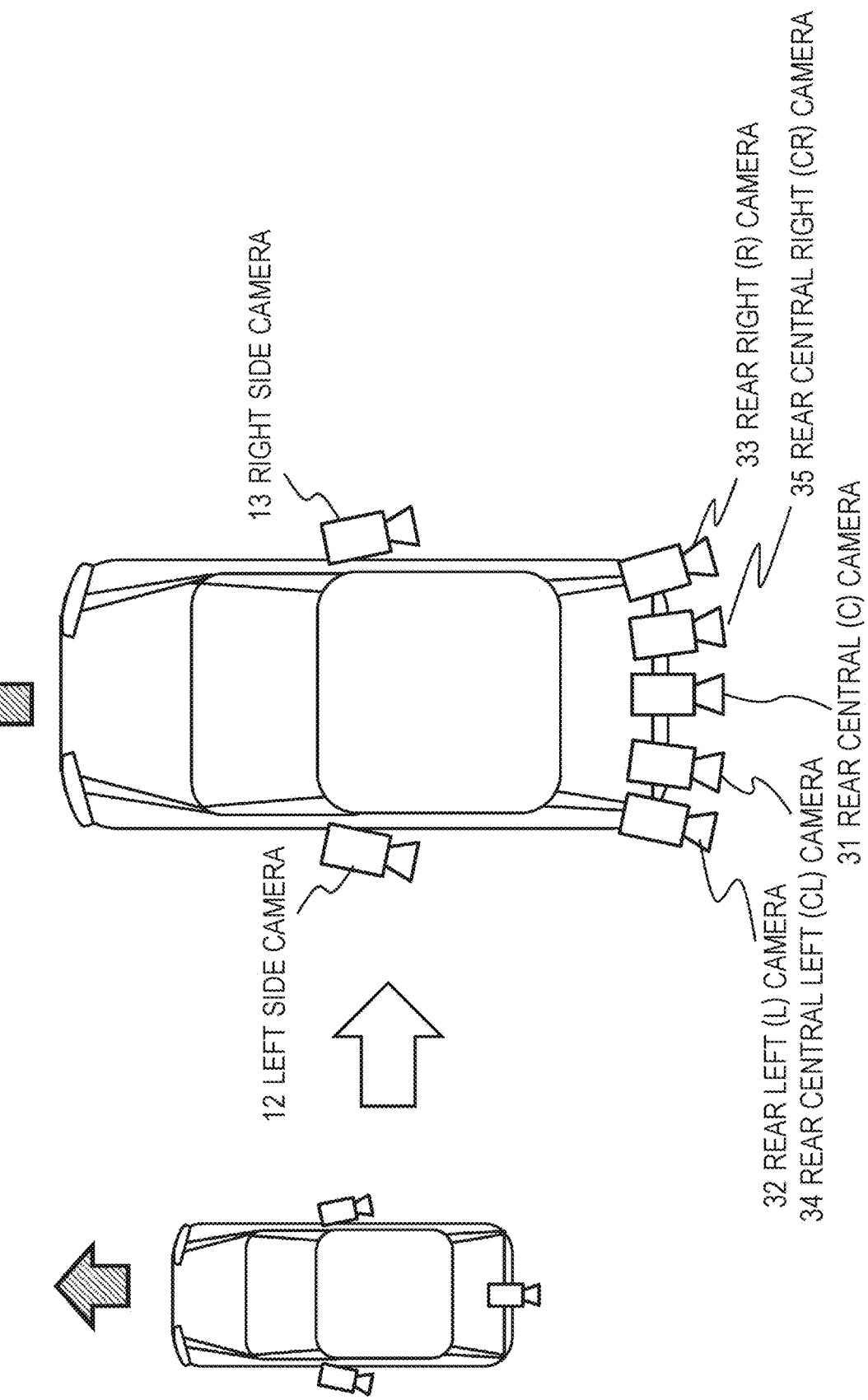
FIG. 15 illustrates an example of camera arrangement in the moving apparatus.

FIG. 15 illustrates an example in which five cameras are installed in the rear of the automobile 10. FIG. 15 illustrates an example similar to the embodiment described with reference to FIGS. 5 to 14. In the example, the rear left (L) camera 32, the rear central (C) camera 31, and the rear right (R) camera 33 are installed. Moreover, a rear central left (CL) camera 34 and a rear central right (CR) camera 35 are provided. The rear CL camera 34 captures an image from a middle viewpoint between the rear L camera 32 and the rear C camera 31. The rear CR camera 35 captures an image from a middle viewpoint between the rear C camera 31 and the rear R camera 33.

Figure 16:
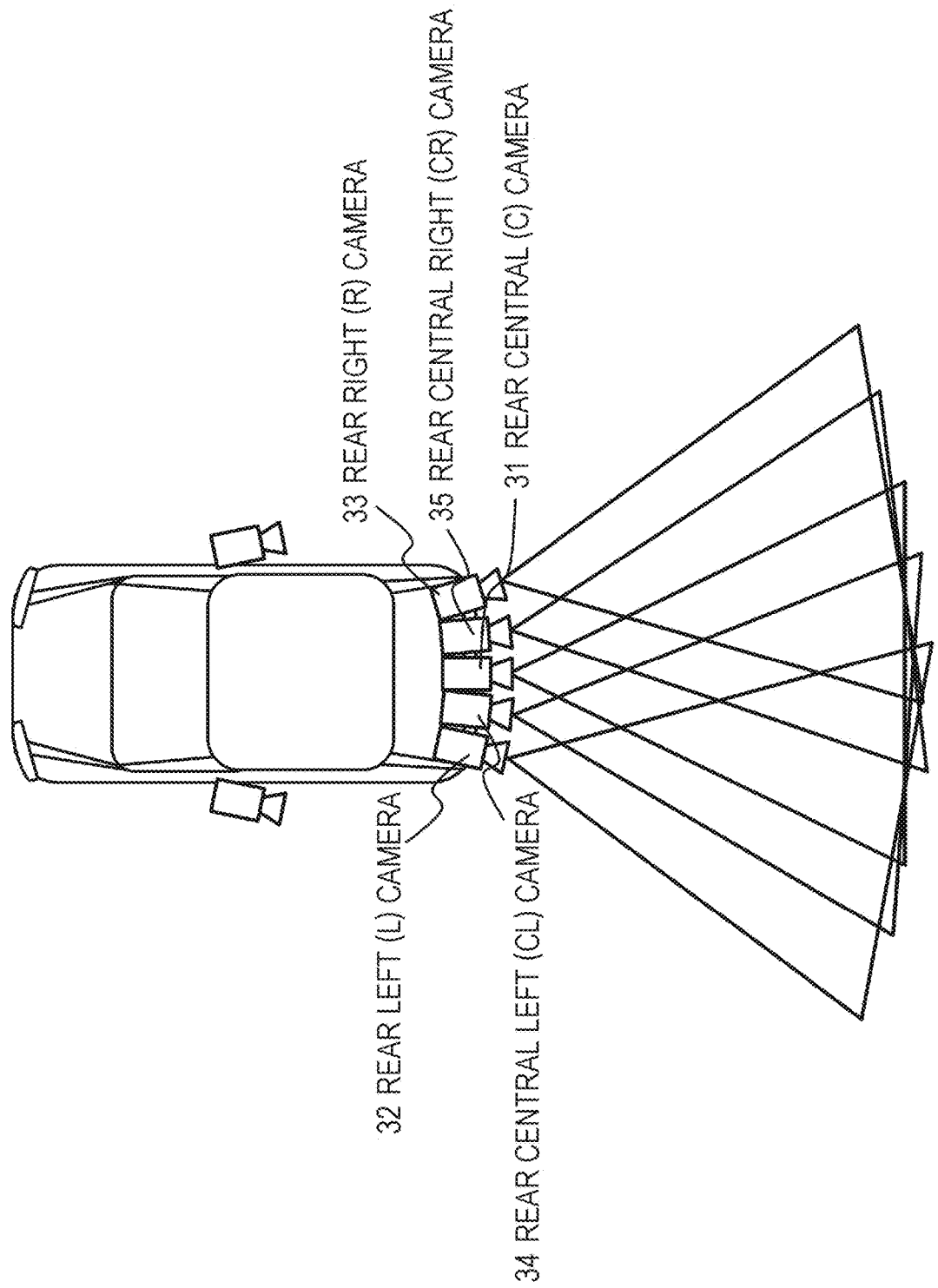
FIG. 16 illustrates an example of camera arrangement in the moving apparatus.

FIG. 16 illustrates an example of imaging regions of these five cameras. FIG. 16 illustrates the imaging regions of the five cameras of the rear left (L) camera 32, the rear central left (CL) camera 34, the rear central (C) camera 31, the rear central right (CR) camera 35, and the rear right (R) camera 33. These five cameras are installed from the left side to the right side of the rear of the automobile 10.

As illustrated in FIG. 16, the five cameras image the rear of the automobile from different viewpoints. Parts of the imaging region overlap with each other. Smoother image switching display is made possible by sequentially switching and displaying images captured by the five cameras having these different imaging viewpoints in accordance with the behavior of a driver, for example, movements of the head.

Figure 17:
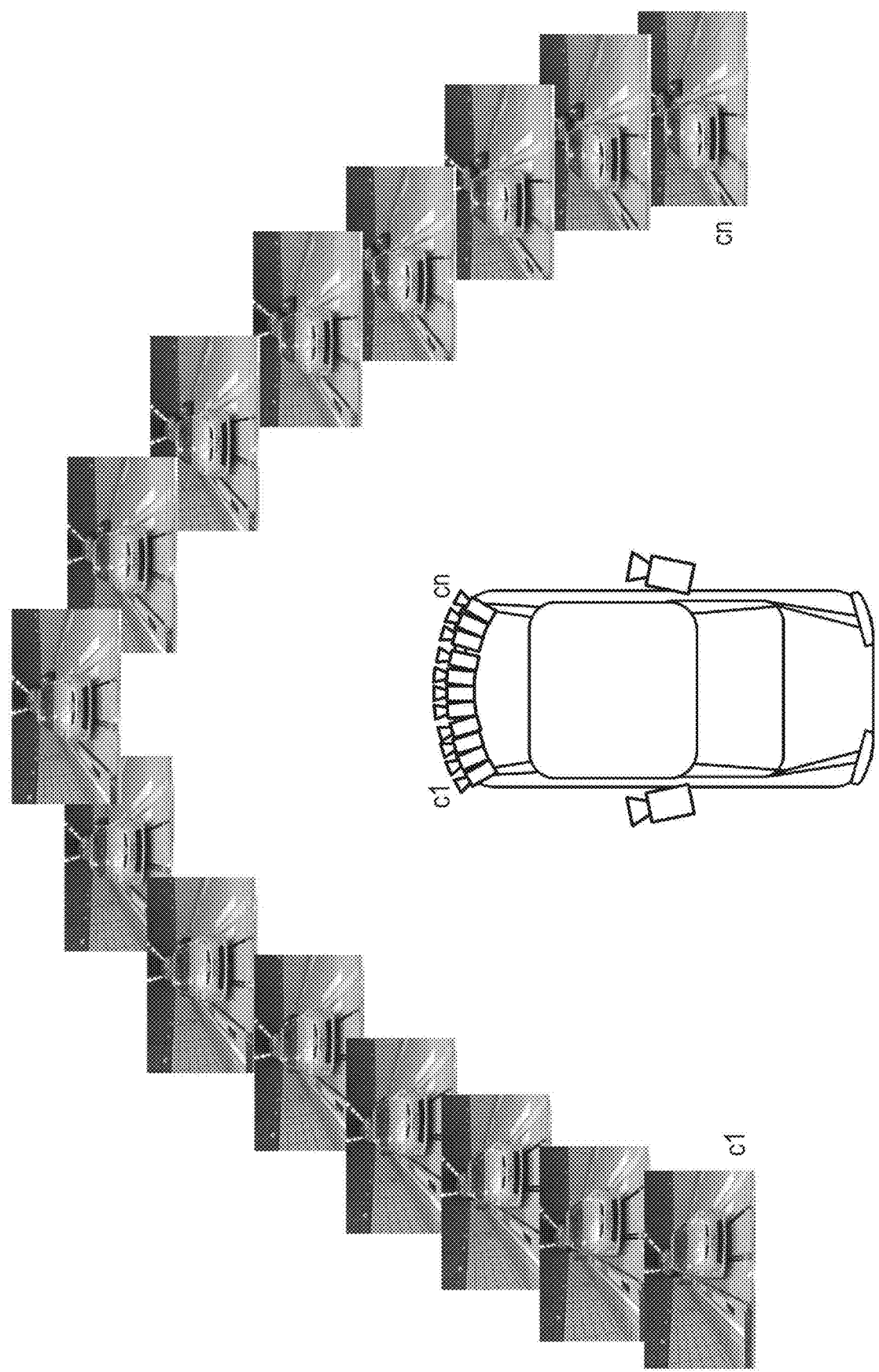
FIG. 17 illustrates an example of camera arrangement and display images in the moving apparatus.

FIG. 17 illustrates an example of switching images in a case where more cameras (c1 to cn=15) are disposed in the rear of the automobile 10 and images are switched.

A driver can observe images smoothly changing like a moving image by sequentially switching manual images captured by a plurality of cameras in this way.

Figure 18:
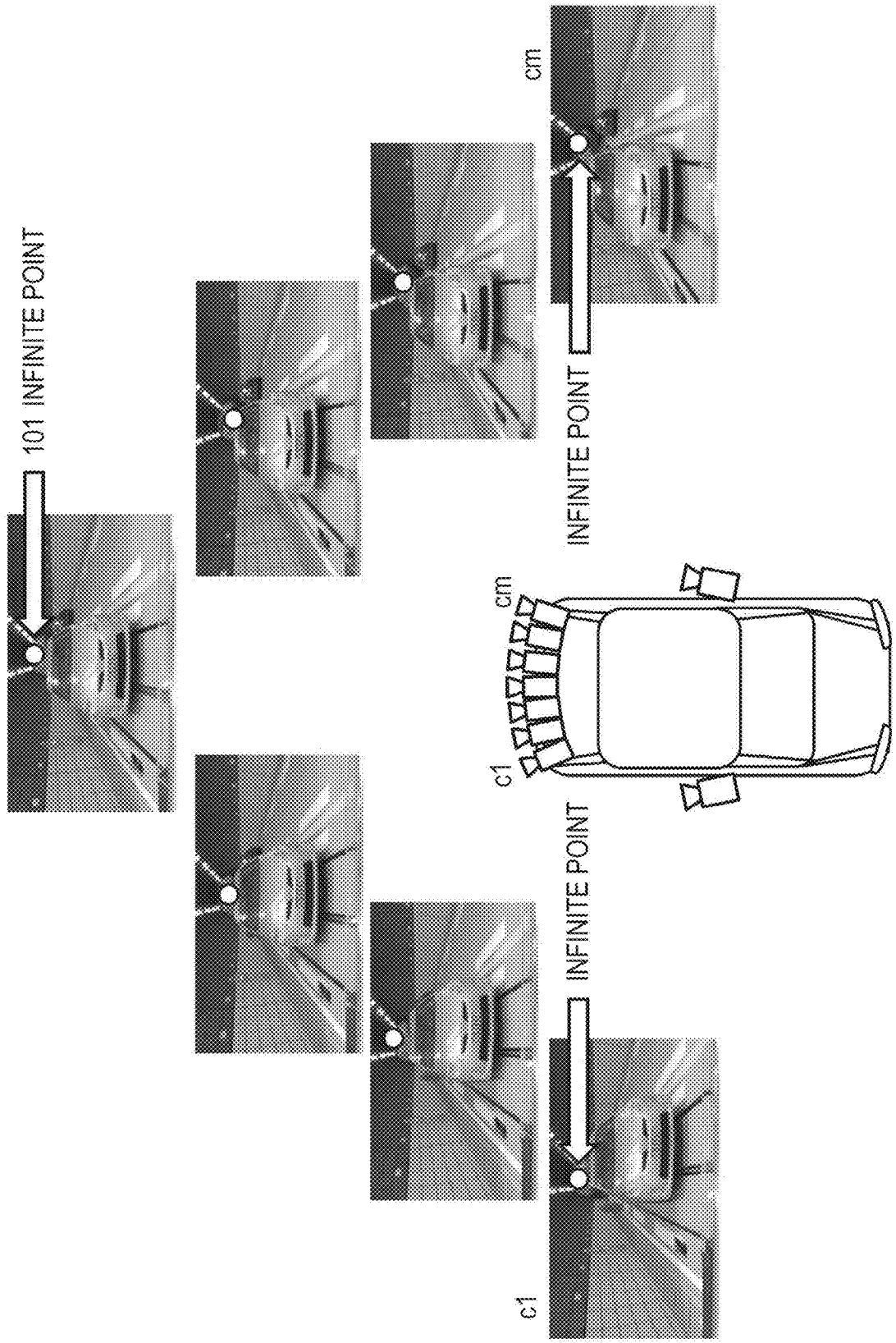
FIG. 18 illustrates an example of camera arrangement and display images in the moving apparatus.

FIG. 18 illustrates an example in which the number of cameras installed in the rear of the automobile 10 is set smaller than that in the example in FIG. 17. Although images may be switched with a small number of cameras in this way, parallax difference between the cameras causes intermittent images. In such a case, processing of calibrating each camera captured image is performed to set and display an infinite point 101 of each image at a fixed position of the image. The processing enables inhibition of subject blurring generated at the time of switching images, and enables an image viewer (driver) to observe a smoothly changing image without unnatural change.

Furthermore, image correction of sweeping and shifting an image in a lateral direction at a neighboring point in an image in accordance with movements of the head of the driver may be performed. The processing enables the driver to visually and intuitively recognize the switching between the camera images.

Furthermore, in a case where a small number of cameras are installed in the rear of the automobile 10, and the parallax difference between the cameras causes intermittent images, a virtual viewpoint image of a middle viewpoint between two adjacent cameras may be synthesized and displayed on the basis of images captured by the two adjacent cameras.

That is, image display control of switching an image output to the display unit to any of images captured by a plurality of cameras or a virtual viewpoint composite image is performed.

Figure 19:
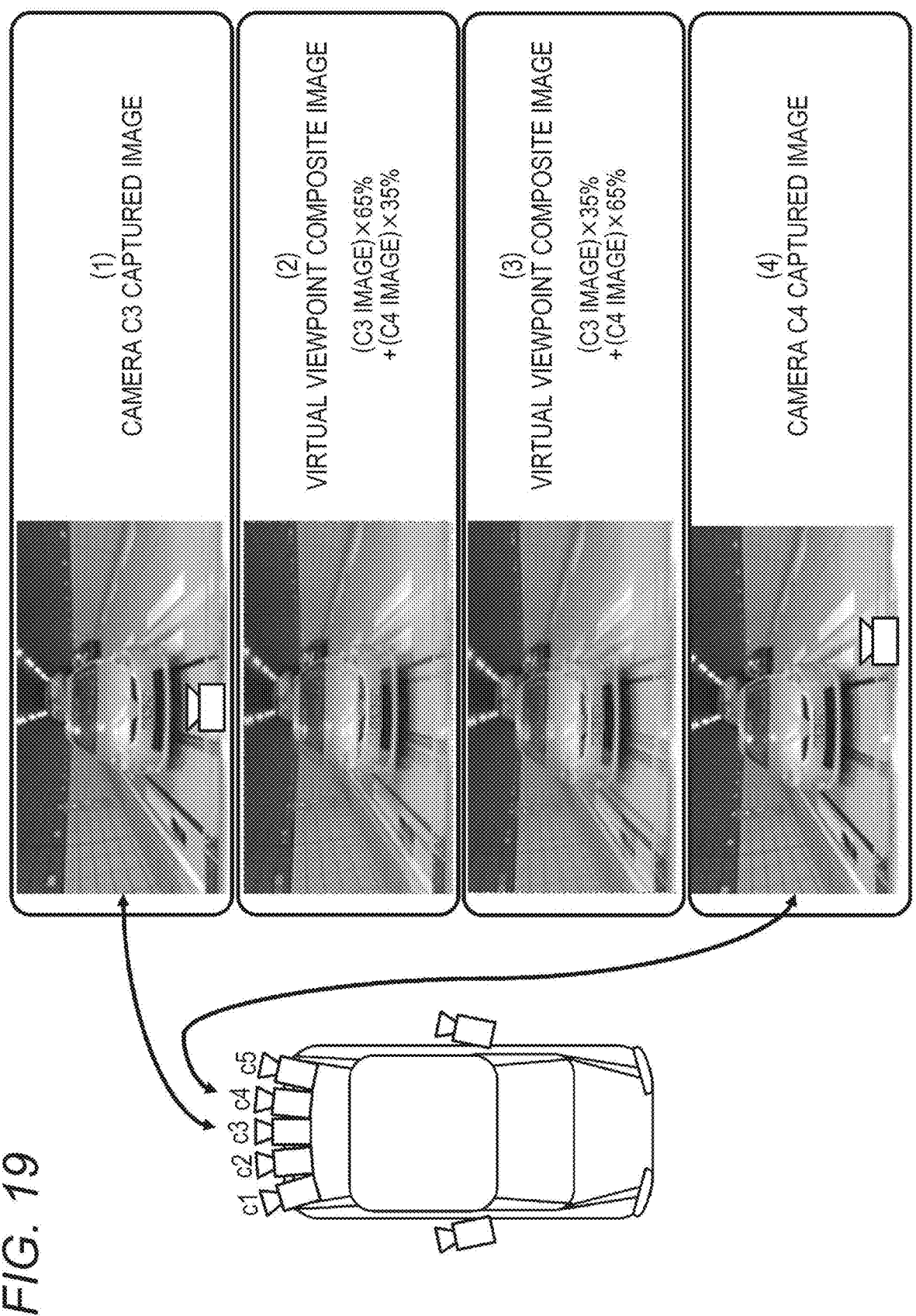
FIG. 19 illustrates an example of camera arrangement and display images in the moving apparatus.

FIG. 19 illustrates an example of generating a virtual viewpoint image. Here, (1) camera C3 captured image and (4) camera C4 captured image in FIG. 19 are images actually captured by adjacent cameras C3 and C4.

Virtual viewpoint composite images of (2) and (3) are generated on the basis of these two actually captured images.

Here, (2) virtual viewpoint composite image is a composite image generated in the proportion of (1) camera C3 captured image of 65% and (4) camera C4 captured image of 35%.

Here, (3) virtual viewpoint composite image is a composite image generated in the proportion of (1) camera C3 captured image of 35% and (4) camera C4 captured image of 65%.

Smoothly changing images can be presented for a driver by sequentially switching and displaying the four images (1) to (4) in FIG. 19.

What is important for the driver is, however, not to visually check the details of an image at a halfway viewpoint between cameras but to judge a rear situation. The driver sometimes cannot judge a switched situation by just instantly viewing an acquired image, at a rear C camera position, captured by the rear C camera 31 at the center of the rear of the car and an image taken from a camera disposed on a side surface. Switching and presenting a plurality of halfway images for the driver enables the driver to sensorily and naturally recognize image switching. Thus, confusion in thinking at the time when instant situation judgment is necessary can be avoided.

Switching based on, for example, the orientation of a face and direction of line-of-sight, switching in accordance with a so-called gesture such as hand or neck shaking, and the like can be used for switching images. Switching with a gesture can give an advantage that it is unnecessary to maintain an improper posture. Note, however, that, in a case where an image is switched without depending on the orientation of a face or the direction of a line-of-sight, the observation posture of the driver is the same. Thus, information indicating switching and transition of an image, for example, auxiliary information such as a switching mark is preferably displayed.

In the processing of the present disclosure, a means for properly checking the rear without occlusion is provided by providing camera images of the rear of a vehicle obtained from a plurality of different viewpoints. The camera images having the different viewpoints are made to have continuity. An image on the halfway of switching is simulatively generated by using human visual characteristics, and presented on a monitor. In this way, the driver can sensorily grasp viewpoint movements from the image. In formation can be provided while reduction or loss in grasping a situation is inhibited. That is, ergonomically, viewpoints can be grasped well by the driver viewing an image that warps between changing cameras having different viewpoints.

Figure 20:
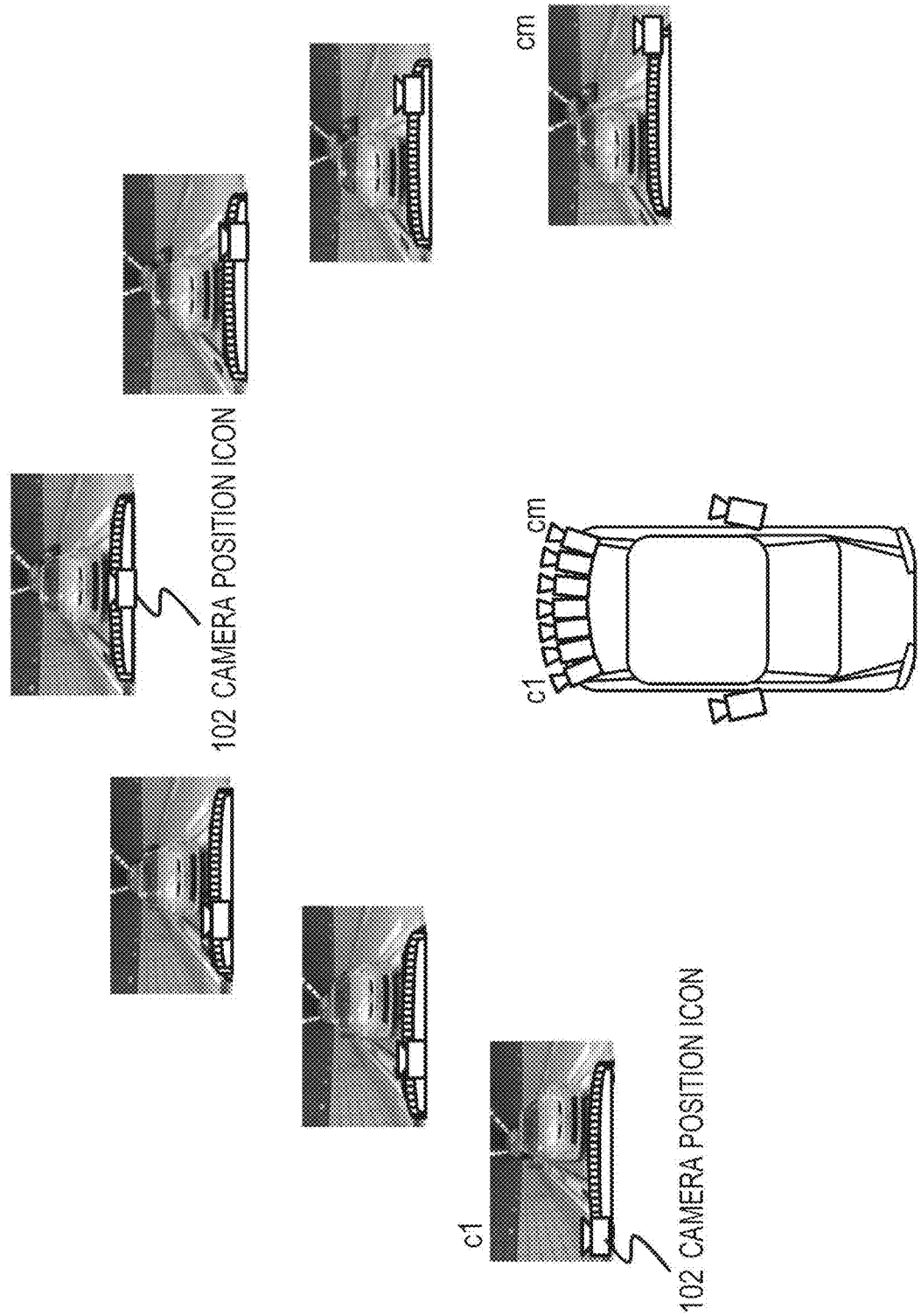
FIG. 20 illustrates an example of camera arrangement and display images in the moving apparatus.

FIG. 20 illustrates an example in which a camera position icon 102 is superimposed and displayed on an image displayed on the display unit 20. The camera position icon 102 indicates a camera imaging viewpoint. In this way, displaying the camera position icon 102, which indicates the position of a camera that has captured an image, together with the image enables the driver to immediately check an image captured position, and more quickly recognize the position of a subject in the image.

Figure 21:
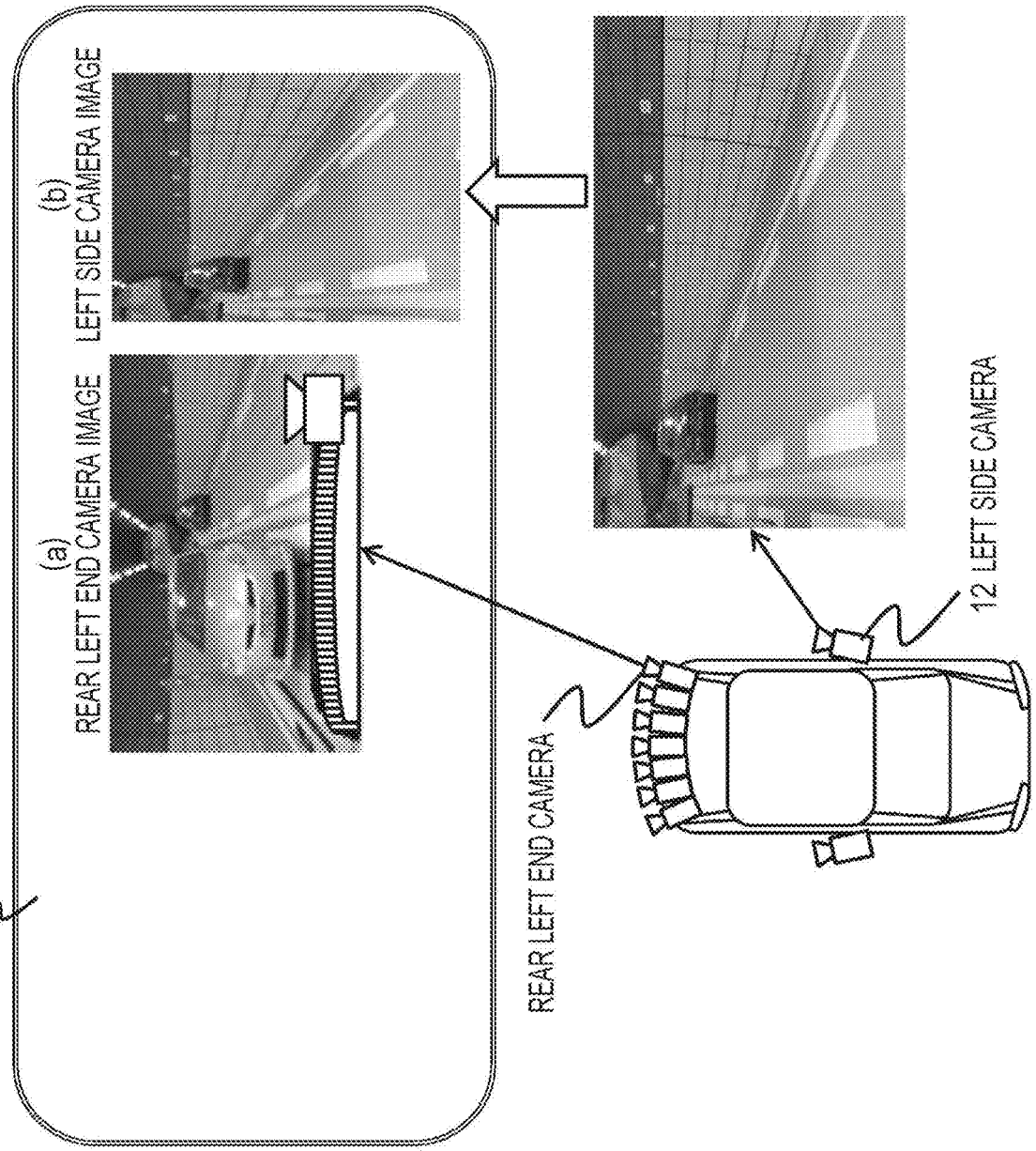
FIG. 21 illustrates an example of camera arrangement and display images in the moving apparatus.

FIG. 21 illustrates an example in which a rear left end camera image and a left side camera image are displayed side by side on the display unit 20. The rear left end camera image is an image captured by a rear left end camera installed at a left end of the rear of the automobile 10. The left side camera image is an image captured by the left side camera 12. Such display enables the situation on the left side of the automobile 10 to be certainly grasped.

Note that, similarly, displaying an image captured by a rear right end camera installed at a right end of the rear of the automobile 10 and an image captured by the right side camera 13 side by side enables the situation on the right side of the automobile 10 to be certainly grasped.

Although FIG. 21 illustrates an example in which a pictogram representing a camera is displayed in the vicinity of a vehicle bumper, a simple color marker, the entire screen, or right and left frames may be displayed thick, and made blinking. Flow zebra caution may be simply displayed. Another caution calling display may be made as long as the driver can intuitively understand camera arrangement at the time of looking at the screen. Furthermore, a plurality of displays may be combined. Furthermore, configuration, in which switching to a display method that does not impair intuitive understanding can be made, can be adopted in accordance with the preference of the driver.

Note that, for example, as illustrated in FIG. 22, the following two installation aspects are mainly adopted as an aspect of installing a plurality of cameras disposed in the rear of the automobile 10.

(a) Radial Arrangement
(b) Linear Arrangement

Here, (a) radial arrangement is an example in which cameras are disposed on a curve having a predetermined curvature, and is characterized by being able to capture an image in a wider range. In contrast, (b) linear arrangement has an advantage that, although the imaging range is narrowed, an amount of deformation of an object in each image is small, and an amount of correction processing for a display image is reduced. Note that, although, contrary to the radial type of (a), arrangement in a direction of convergence to a rear neighboring point is possible in a convergence arrangement, the installation aspect has a disadvantage that continuity in directions to the left side camera 12 and the right side camera 13 cannot be obtained. An image of actually installed camera is used as a projection image of a central projection image, and it is not necessary to dispose an optical axis in each direction. An image may be converted from a fisheye projection image, and image conversion may be used so that an optical axis of a virtual central projection image corresponds to an optical axis in accordance with each installation aspect.

4. Image Processing Apparatus and Sequence of Processing Executed by Moving Apparatus Next, an image processing apparatus and a sequence of processing executed by a moving apparatus of the present disclosure will be described with reference to the flowchart of FIG. 23.

Figure 23:
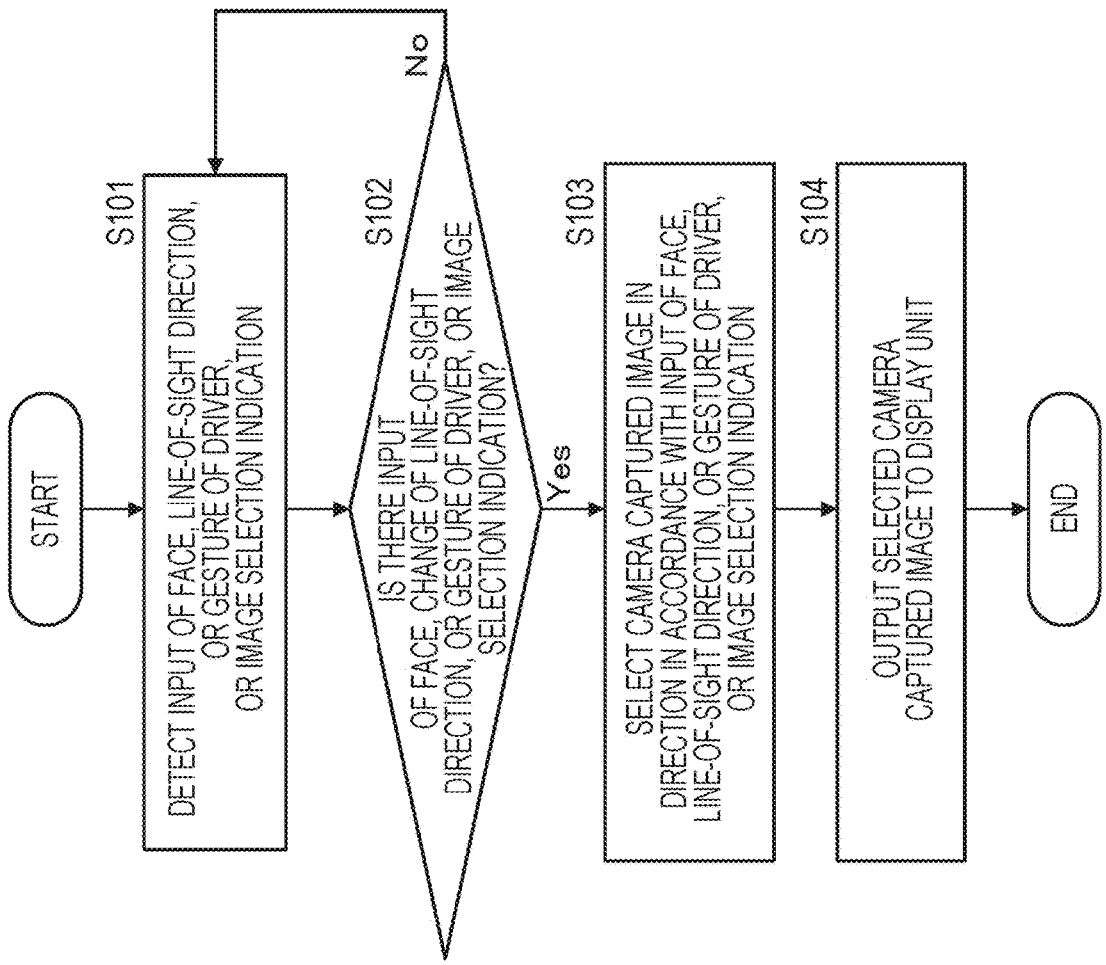
FIG. 23 is a flowchart illustrating a processing sequence executed by the image processing apparatus.

The processing of the flow in FIG. 23 and subsequent figures is executed in a moving apparatus or an image processing apparatus mounted in the moving apparatus. For example, the processing is performed under the control of a data processing unit including a processor such as a CPU. The processor has a function of executing a program in accordance with the program stored in a storage unit in an apparatus.

The processing of each step of the flow in FIG. 23 will be described below.

(Step S101)

First, in Step S101, the data processing unit detects a face, line-of-sight direction, or a gesture of a driver, or information regarding operations of the driver.

This is processing of, for example, the data processing unit 60 in FIG. 12 inputting detection information from the driver information detection unit 52 and information regarding operations of the driver to the operation unit.

(Step S102)

Next, in Step S102, the data processing unit determines whether or not the input of a face, change of a line-of-sight direction, or a gesture of a driver, or information regarding operations of the driver is detected.

If the input is detected, the processing proceeds to Step S103. If the input is not detected, the detection processing of Step S101 is continued.

(Step S103)

Next, in Step S103, the data processing unit selects a camera captured image in a direction in accordance with the face, the line-of-sight direction, or the gesture of the driver, or the operation information, which has been input in Step S102.

Note that, for example, if there is no image that completely matches a line-of-sight direction of the driver, an image in a closest direction is selected.

For example, if the face of, the line-of-sight, or the gesture the driver, or the input to the operation unit is in a left direction, an image captured by a camera (rear L camera) on the left side of the rear of the automobile 10 is selected.

Furthermore, for example, if the face, the line-of-sight, or the gesture of the driver, or the input to the operation unit is in a central direction, an image captured by a camera (rear C camera) in the center of the rear of the automobile 10 is selected. Alternatively, for example, if the face, the line-of-sight, or the gesture of the driver, or the input to the operation unit is in a right direction, an image captured by a camera (rear R camera) on the right side of the rear of the automobile 10 is selected.

(Step S104)

Next, in Step S104, the data processing unit displays the image that has been selected in Step S103 on the display unit.

Note that various settings can be adopted for an image displayed on the display unit. The various settings include, for example, a setting in which only a selected rear camera captured image is displayed and a setting in which two side camera images captured by right and left side cameras are displayed together.

In the flow in FIG. 23, processing of selecting an image in the nearest direction is performed in a case where, for example, there is no image that completely matches a line-of-sight direction of the driver at the time when a camera captured image in a direction in accordance with the face, the line-of-sight direction, or the gesture of the driver, or the operation information, which has been input in Step S102, is selected.

Figure 24:
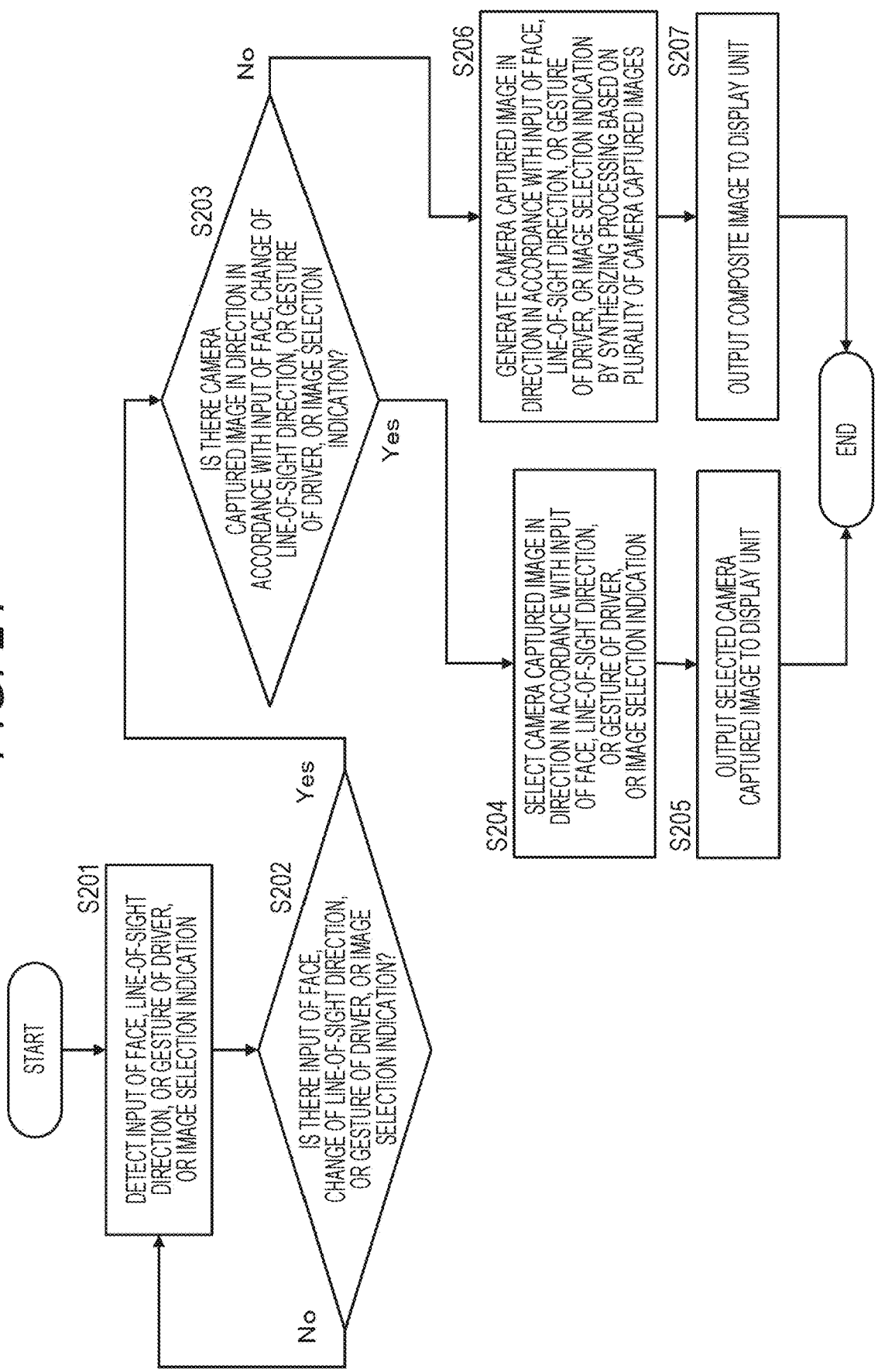
FIG. 24 is a flowchart illustrating the processing sequence executed by the image processing apparatus.

Next, a sequence of processing of synthesizing images in the line-of-sight direction of the driver in such a case, that is, in a case where there is no image that completely matches the line-of-sight direction of the driver will be described with reference to the flowchart of FIG. 24.

The processing of each step of the flow in FIG. 24 will be described below.

(Step S201)

First, in Step S201, the data processing unit detects a face, a line-of-sight direction, or a gesture of a driver, or information regarding operations of the driver.

This is processing of, for example, the data processing unit 60 in FIG. 12 inputting detection information from the driver information detection unit 52 and information regarding operations of the driver to the operation unit.

(Step S202)

Next, in Step S202, the data processing unit determines whether or not the input of a face, change of a line-of-sight direction, a gesture of a driver, or information regarding operations of the driver is detected.

If the input is detected, the processing proceeds to Step S203. If the input is not detected, the detection processing of Step S201 is continued.

(Step S203)

Next, in Step S203, the data processing unit determines the presence or absence of a camera captured image in a direction in accordance with the face, change of the line-of-sight direction, or the gesture of the driver, or the information regarding operations of the driver, which has been input in Step S202.

If there is a captured image in the matching direction, the processing proceeds to Step S204.

In contrast, if there is no captured image in the matching direction, the processing proceeds to Step S206.

(Step S204)

In a case where it is determined in Step S203 that there is the camera captured image in a direction in accordance with the face, change of the line-of-sight direction, or the gesture of the driver, or the information regarding operations of the driver, which has been input in Step S202, the processing of Steps S204 and S205 is executed. The display is mainly suitable for a case where cameras are adjacently disposed at the time of switching and an image is not described in a bound. If imaging directions of switching images are far away from each other, switching in accordance with the later-described Step S206 is performed.

In Step S204, a camera captured image in a direction in accordance with the face, the line-of-sight direction, or the gesture of the driver, or the operation information, which has been input in Step S202, is selected.

For example, if the face, the line-of-sight, or the gesture of the driver, or the input to the operation unit is in a left direction, an image captured by a camera (rear L camera) on the left side of the rear of the automobile 10 is selected.

Furthermore, for example, if the face, the line-of-sight, or the gesture of the driver, or the input to the operation unit is in a central direction, an image captured by a camera (rear C camera) in the center of the rear of the automobile 10 is selected. Alternatively, for example, if the face, the line-of-sight, or the gesture of the driver, or the input to the operation unit is in a right direction, an image captured by a camera (rear R camera) on the right side of the rear of the automobile 10 is selected.

(Step S205)

Next, in Step S205, the data processing unit displays the image that has been selected in Step S204 on the display unit.

Note that various settings can be adopted for an image displayed on the display unit. The various settings include, for example, a setting in which only a selected rear camera captured image is displayed and a setting in which two side camera images captured by right and left side cameras are displayed together.

(Step S206)

In contrast, in a case where it is determined in Step S203 that there is no camera captured image in a direction in accordance with the face, change of the line-of-sight direction, or the gesture of the driver, or the information regarding operations of the driver, which has been input in Step S202, the processing of Steps S206 and S207 is executed.

First, in Step S206, processing of generating, as a composite image, a camera captured image in a direction in accordance with the face of, change of the line-of-sight direction, or the gesture of the driver, or the information regarding operations of the driver, which has been input in Step S202 is executed.

The composite image generating processing corresponds to, for example, the image synthesizing processing described above with reference to FIG. 19.

The image synthesizing processing can be performed by, for example, simply adding a weight to images actually captured by adjacent cameras. Furthermore, a middle virtual image may be generated by detecting a moving object for each region and performing correction on the basis of the detection information. Note that information loss of a driver is prevented by presenting a composite image of a middle viewpoint between actually captured images to the driver. Specifically, for example, if the captured image is switched from the rear central (C) camera 31 to a side camera, the image greatly changes in an instant. The composite image is effective in preventing the information loss of the driver, which may occur in such a case.

Note that, for example, input of the face, the line-of-sight direction, or gesture of the driver, or image selection indication in Step S206 makes various movements such as moderate movements and sharp movements. Steps 206 and 207 are executed as steps of generating one or two or more plurality of middle images, that is, composite images in accordance with the detected movement.

(Step S207)

Next, in Step S207, the data processing unit displays the composite image that has been generated in Step S206 on the display unit. In addition, the driver can grasp the camera position of the display image by superimposing and displaying the description camera position on a screen of the display unit 20 in FIG. 21 at the time when the composite image in Step S207 is output to the display unit. Note that various settings can be adopted for an image displayed on the display unit. The various settings include, for example, a setting in which only a selected rear camera captured image is displayed and a setting in which two side camera images captured by right and left side cameras are displayed together.

Furthermore, in the description of the sequence, images are switched by, for example, movement of face, line-of-sight, and head based on the will of the driver, a gesture, or an operation. In contrast, as described above with reference to FIGS. 7, 8, and 9, an object behind a vehicle in the rear, that is, an object in an occlusion region may be detected, and a warning prompting a driver to visually check details may be displayed as a trigger for the driver to check a side camera image at the time when the driver looks at the rear central (C) camera 31. The warning includes a zebra pattern and a blinking superposition warning display at the rear object boundary that generates the occlusion.

That is, if, for example, a large vehicle approaches behind, and only an image captured by a central camera is used, an approaching vehicle or the like behind the large vehicle is easily overlooked due to the occlusion. In such a case, a warning indicating that an object is in the occlusion region is displayed. The warning prompts the driver to perform checking with images captured by cameras having different viewpoints. The processing enables the driver to change the camera viewpoints and certainly check the rear situation even in a case where there is occlusion, thereby improving safety.

Note that an image may be switched in configuration in which different camera captured images in a single bound are provided. Preferably, an image having a virtual viewpoint between cameras is output between different camera captured images, and display with image transition and continuity is performed. The processing prevents loss in grasping a situation of the driver, and achieves safe checking of the rear side.

5. Configuration Example of Image Processing Apparatus

Next, a hardware configuration example of an image processing apparatus that executes the above-described processing will be described.

FIG. 25 illustrates a hardware configuration example of the image processing apparatus.

A central processing unit (CPU) 501 functions as a data processing unit that executes various pieces of processing in accordance with a program stored in a read only memory (ROM) 502 or a storage unit 508. For example, processing is performed in accordance with the sequence described in the above-described embodiment.

For example, a program to be executed by the CPU 501 and data are stored in a random access memory (RAM) 503. These CPU 501, ROM 502, and RAM 503 are mutually connected by a bus 504.

The CPU 501 is connected to an input/output interface 505 via the bus 504. An input unit 506 and an output unit 507 are connected to the input/output interface 505. The input unit 506 includes, for example, a situation data acquisition unit such as various switches, a keyboard, a touch panel, a mouse, a microphone, a sensor, a camera, and a GPS. The output unit 507 includes, for example, a display and a speaker.

The CPU 501 inputs, for example, a command and situation data input from the input unit 506, executes various pieces of processing, and outputs the processing result to, for example, the output unit 507.

The storage unit 508 connected to the input/output interface 505 includes, for example, a hard disk, and stores a program to be executed by the CPU 501 and various pieces of data. A communication unit 509 functions as a transmission/reception unit for data communication via a network such as the Internet or a local area network, and communicates with an external apparatus.

A drive 510 connected to the input/output interface 505 drives a removable medium 511 including a magnetic disk, an optical disk, a magneto-optical disk, and a semiconductor memory such as a memory card. The drive 510 records or reads data.

6. Summary of Configuration of Present Disclosure

The embodiments of the present disclosure have been described in detail above with reference to the specific embodiments. It is, however, obvious that those skilled in the art can modify or substitute the embodiments without departing from the gist of the present disclosure. That is, the present invention has been disclosed in the form of exemplification, and should not be limitedly interpreted. The claims should be considered in order to determine the gist of the present disclosure.

Note that the technology disclosed in the specification can have configurations as follows.

(1) An image processing apparatus including a data processing unit that executes image display control of:
  inputting
  driver information indicating behavior of a driver of a moving apparatus and images captured by a plurality of cameras that images a situation around the moving apparatus from different viewpoints; and switching an image output to a display unit to any of the images captured by the plurality of cameras or a virtual viewpoint composite image in accordance with the driver information.

(2) The image processing apparatus according to (1), in which the plurality of cameras includes a plurality of rear cameras installed in a rear of the moving apparatus, and the data processing unit performs switching to and display of any of images captured by the plurality of rear cameras or a virtual viewpoint composite image in accordance with the driver information.

(3) The image processing apparatus according to (1), in which the plurality of cameras includes: a plurality of rear cameras installed in a rear of the moving apparatus; and a side camera installed on a side surface of the moving apparatus, and the data processing unit performs switching to and display of any of images captured by the plurality of rear cameras and the side camera or a virtual viewpoint composite image in accordance with the driver information.

(4) The image processing apparatus according to any one of (1) to (3), in which the data processing unit displays one rear camera captured image and an image captured by a side camera on the display unit side by side, the rear camera captured image having been selected from images captured by a plurality of rear cameras installed in a rear of the moving apparatus in accordance with the driver information, the side camera being installed on a side surface of the moving apparatus.

(5) The image processing apparatus according to any one of (1) to (4), in which the driver information includes information obtained by detecting a direction of a face or line-of-sight of the driver, and the data processing unit displays an image in a direction corresponding to the direction of a face or line-of-sight of the driver on the display unit.

(6) The image processing apparatus according to any one of (1) to (4), in which the driver information includes information obtained by detecting a gesture of the driver, and the data processing unit displays an image in a direction in accordance with a gesture of the driver on the display unit.

(7) The image processing apparatus according to any one of (1) to (4), in which the data processing unit displays an image in a direction in accordance with input of the driver to an operation unit on the display unit.

(8) The image processing apparatus according to any one of (1) to (7), in which the virtual viewpoint composite image is a composite image based on images captured by a plurality of cameras, and is a composite image corresponding to a captured image from a virtual viewpoint between imaging viewpoints of the plurality of cameras.

(9) The image processing apparatus according to any one of (1) to (8), in which the driver information includes information obtained by detecting a direction of a face or line-of-sight of the driver, and the data processing unit generates an image in a direction corresponding to the direction of a face or line-of-sight of the driver by synthesizing images captured by a plurality of cameras, and displays the image on the display unit.

(10) The image processing apparatus according to any one of (1) to (9), in which the data processing unit executes image calibration processing of matching positions of infinite points of images at a time of switching display of an image on the display unit.

(11) A moving apparatus including:

a plurality of cameras that images a situation around the moving apparatus from different viewpoints;

a driver information detection unit that detects driver information indicating behavior of a driver of the moving apparatus; and a data processing unit that inputs the driver information and images captured by the plurality of cameras, and switches an image output to a display unit to any of the images captured by the plurality of cameras or a virtual viewpoint composite image in accordance with the driver information.

(12) The moving apparatus according to (11), in which the plurality of cameras includes a plurality of rear cameras installed in a rear of the moving apparatus, and the data processing unit performs switching to and display of any of images captured by the plurality of rear cameras or a virtual viewpoint composite image in accordance with the driver information.

(13) The moving apparatus according to (11) or (12), in which the driver information detection unit detects a direction of a face or line-of-sight of the driver, and the data processing unit displays an image in a direction corresponding to the direction of a face or line-of-sight of the driver on the display unit.

(14) An image processing method executed in an image processing apparatus, in which a data processing unit executes image display control of:

inputting driver information indicating behavior of a driver of a moving apparatus and images captured by a plurality of cameras that images a situation around the moving apparatus from different viewpoints; and switching an image output to a display unit to any of the images captured by the plurality of cameras or a virtual viewpoint composite image in accordance with the driver information.

(15) A display image control method executed in a moving apparatus, comprising:

an image capturing step in which a plurality of cameras images a situation around the moving apparatus from different viewpoints;

a driver information detection step in which a driver information detection unit detects driver information indicating behavior of a driver of the moving apparatus; and an image display control step in which a data processing unit inputs the driver information and images captured by the plurality of cameras, and switches an image output to a display unit to any of the images captured by the plurality of cameras or a virtual viewpoint composite image in accordance with the driver information.

(16) A program for executing image processing in an image processing apparatus, causing a data processing unit to execute image display control of:
inputting
driver information indicating behavior of a driver of a moving apparatus and
images captured by a plurality of cameras that images a situation around the moving apparatus from different viewpoints; and
switching an image output to a display unit to any of the images captured by the plurality of cameras or a virtual viewpoint composite image in accordance with the driver information.

Furthermore, a series of processing described in the specification can be executed by hardware, software, or a combined configuration of both. In a case where the processing is executed by software, a program, in which a processing sequence is recorded, can be executed by being installed in a memory in a computer incorporated in dedicated hardware or being installed in a general-purpose computer capable of executing various pieces of processing. For example, a program can be preliminarily recorded in a recording medium. In addition to being installed in a computer from a recording medium, a program can be received via a network such as a local area network (LAN) and the Internet, and installed in a recording medium such as a built-in hard disk.

Note that the various pieces of processing described in the specification may be not only executed in chronological order in accordance with the description, but executed in parallel or individually in accordance with the processing capability or needs of an apparatus that executes processing. Furthermore, a system in the specification has configuration of a logical set of a plurality of apparatuses. The system is not limited to a system in which apparatuses having each configuration are placed in the same housing.

INDUSTRIAL APPLICABILITY

As described above, according to the configuration of one embodiment of the present disclosure, configuration, in which images output to a display unit are switched and displayed in accordance with the behavior of a driver, such as movements of the head of the driver, is achieved.

Specifically, for example, driver information indicating the behavior of a driver of a moving apparatus and images captured by a plurality of cameras that images the situation around the moving apparatus from different viewpoints are input. Images output to the display unit are switched in accordance with driver information. The plurality of cameras is, for example, a plurality of rear cameras installed in the rear of the moving apparatus. For example, a direction of the face or line-of-sight of the driver is detected. An image in a direction corresponding to the detected face or direction of line-of-sight of the driver is selected as an output image, and displayed on a display unit. Alternatively, an image in a direction indicated by a gesture of the driver is selected, and displayed on the display unit. Furthermore, a composite image having a middle viewpoint is appropriately generated and displayed at the time when different camera captured images are switched, whereby loss of the driver in grasping a situation is prevented.

The configuration achieves configuration in which images output to the display unit are switched and displayed in accordance with the behavior of the driver, such as movements of the head of the driver.

REFERENCE SIGNS LIST

10 Automobile
11 Rear camera
12 Left side camera
13 Right side camera
20 Display unit
21 Rear camera image
22 Left side camera image
23 Right side camera image
25 Composite image
31 Rear central (C) camera
32 Rear left (L) camera
33 Rear right (R) camera
34 Rear central left (CL) camera
35 Rear central right (CR) camera
41 Rear-camera-image switching display region
50 Driver
52 Driver information detection unit
60 Data processing unit
101 Infinite point
102 Camera position icon
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An image processing apparatus comprising a data processing unit including circuitry that executes image display control of:
receiving
driver information indicating behavior of a driver of a moving apparatus and
images captured by a plurality of cameras that images a situation around the moving apparatus from different viewpoints; and
switching an image output to a display unit to display a virtual viewpoint composite image in accordance with the driver information wherein the virtual viewpoint composite image has a viewpoint between two adjacent cameras of the plurality of cameras.

2. The image processing apparatus according to claim 1, wherein the plurality of cameras includes a plurality of rear cameras installed in a rear of the moving apparatus, and
the data processing unit performs switching to and display of the virtual viewpoint composite image in accordance with the driver information.

3. The image processing apparatus according to claim 1, wherein the plurality of cameras includes: a plurality of rear cameras installed in a rear of the moving apparatus; and a side camera installed on a side surface of the moving apparatus, and
the data processing unit performs switching to and display of the virtual viewpoint composite image in accordance with the driver information.

4. The image processing apparatus according to claim 1, wherein the driver information includes information obtained by detecting a direction of a face or line-of-sight of the driver, and
the data processing unit displays the virtual viewpoint composite image in a direction corresponding to the direction of a face or line-of-sight of the driver on the display unit.

5. The image processing apparatus according to claim 1, wherein the driver information includes information obtained by detecting a gesture of the driver, and
the data processing unit displays the virtual viewpoint composite image in a direction in accordance with a gesture of the driver on the display unit.

6. The image processing apparatus according to claim 1, wherein the data processing unit displays the virtual viewpoint composite image in a direction in accordance with input of the driver to an operation unit on the display unit.

7. The image processing apparatus according to claim 1, wherein the virtual viewpoint composite image is a composite image based on images captured by a plurality of cameras, and is a composite image corresponding to a captured image from a virtual viewpoint between imaging viewpoints of the plurality of cameras.

8. The image processing apparatus according to claim 1, wherein the driver information includes information obtained by detecting a direction of a face or line-of-sight of the driver, and
the data processing unit generates the virtual viewpoint composite image in a direction corresponding to the direction of a face or line-of-sight of the driver by synthesizing images captured by a plurality of cameras, and displays the image on the display unit.

9. The image processing apparatus according to claim 1, wherein the data processing unit executes image calibration processing of matching positions of infinite points of images at a time of switching display of an image on the display unit.

10. A moving apparatus comprising:
a plurality of cameras that captures images of a situation around the moving apparatus from different viewpoints;
a driver information detection unit that detects driver information indicating behavior of a driver of the moving apparatus; and
a data processing unit including circuitry that inputs the driver information and the images captured by the plurality of cameras, and switches an image output to a display unit to display a virtual viewpoint composite image in accordance with the driver information, wherein the virtual viewpoint composite image has a viewpoint between two adjacent cameras of the plurality of cameras.

11. The moving apparatus according to claim 10, wherein the plurality of cameras includes a plurality of rear cameras installed in a rear of the moving apparatus, and
the data processing unit performs switching to and display of the virtual viewpoint composite image in accordance with the driver information.

12. The moving apparatus according to claim 10, wherein the driver information detection unit detects a direction of a face or line-of-sight of the driver, and
the data processing unit displays the virtual viewpoint composite image in a direction corresponding to the direction of a face or line-of-sight of the driver on the display unit.

13. An image processing method executed in an image processing apparatus,
wherein a data processing unit includes circuitry that executes image display control of:
receiving
driver information indicating behavior of a driver of a moving apparatus and
images captured by a plurality of cameras that images a situation around the moving apparatus from different viewpoints; and
switching an image output to a display unit to display a virtual viewpoint composite image in accordance with the driver information, wherein the virtual viewpoint composite image has a viewpoint between two adjacent cameras of the plurality of cameras.

14. A display image control method executed in a moving apparatus, comprising:
a plurality of cameras capturing images of a situation around the moving apparatus from different viewpoints;
a driver information detection unit detecting driver information indicating behavior of a driver of the moving apparatus; and
a data processing unit including circuitry receiving the driver information and images captured by the plurality of cameras, and switching an image output to a display unit to display a virtual viewpoint composite image in accordance with the driver information, wherein the virtual viewpoint composite image has a viewpoint between two adjacent cameras of the plurality of cameras.

15. A non-transitory computer readable medium storing instructions that cause circuitry in a data processing unit to execute image display control of:
receiving
driver information indicating behavior of a driver of a moving apparatus and
images captured by a plurality of cameras that images a situation around the moving apparatus from different viewpoints; and
switching an image output to a display unit to display a virtual viewpoint composite image in accordance with the driver information wherein the virtual viewpoint composite image has a viewpoint between two adjacent cameras of the plurality of cameras.

* * * * *